US 8,949,580 B2

(12) United States Patent
Li et al.

(10) Patent No.: US 8,949,580 B2
(45) Date of Patent: Feb. 3, 2015

(54) RISC PROCESSOR APPARATUS AND METHOD FOR SUPPORTING X86 VIRTUAL MACHINE

(75) Inventors: Guojie Li, Beijing (CN); Weiwu Hu, Beijing (CN); Xiaoyu Li, Beijing (CN); Menghao Su, Beijing (CN)

(73) Assignee: Longsoon Technology Corporation Limited, Beijing (CN)

( * ) Notice: Subject to any disclaimer, the term of this patent is extended or adjusted under 35 U.S.C. 154(b) by 957 days.

(21) Appl. No.: 12/922,949

(22) PCT Filed: Dec. 17, 2008

(86) PCT No.: PCT/CN2008/002023
§ 371 (c)(1),
(2), (4) Date: Oct. 21, 2010

(87) PCT Pub. No.: WO2009/114961
PCT Pub. Date: Sep. 24, 2009

(65) Prior Publication Data
US 2011/0035745 A1    Feb. 10, 2011

(30) Foreign Application Priority Data

Mar. 17, 2008 (CN) .......................... 2008 1 0102086

(51) Int. Cl.
*G06F 9/30* (2006.01)
(52) U.S. Cl.
CPC ........ *G06F 9/30174* (2013.01); *G06F 9/30094* (2013.01); *G06F 9/30185* (2013.01); *G06F 9/30076* (2013.01)
USPC ........................................................ 712/209
(58) Field of Classification Search
CPC .......................... G06F 9/30174; G06F 9/30185
See application file for complete search history.

(56) References Cited

U.S. PATENT DOCUMENTS 5,574,927 A * 11/1996 Scantlin .......................... 712/41
5,685,009 A   11/1997 Blomgren et al.
(Continued)

FOREIGN PATENT DOCUMENTS

CN      1607503      4/2005
CN    101256504      9/2008
(Continued)

OTHER PUBLICATIONS

Japanese Office Action from Japanese Patent Application No. JP2011-500028, Jun. 4, 2013, pp. 1-5.

*Primary Examiner* — Idriss N Alrobaye
*Assistant Examiner* — John Lindlof
(74) *Attorney, Agent, or Firm* — Cesari and McKenna, LLP

(57) ABSTRACT

A RISC processor apparatus and method for supporting an X86 virtual machine. The RISC processor includes: an instruction module for storing a virtual machine instruction set that supports the X86 virtual machine; a decoder for, during the decoding of an instruction of the virtual machine instruction set, distinguishing the virtual machine instruction set mode of the instruction, decoding the instruction according to the distinguished virtual machine instruction set mode, and outputting the decoded instruction to a fixed-point operation component or a floating-point operation component according to the distinguished virtual machine instruction set mode; the fixed-point operation component for processing the fixed-point instruction of the virtual machine instruction set according to the output of the decoder and outputting the execution result; the floating-point operation component for processing the floating-point instruction of the virtual machine instruction set according to the output of the decoder and outputting the execution result.

15 Claims, 2 Drawing Sheets

(56) References Cited

U.S. PATENT DOCUMENTS

| | | |
|---|---|---|
| 5,854,913 A | 12/1998 | Goetz et al. |
| 6,076,155 A | 6/2000 | Blomgren et al. |
| 6,751,737 B1 | 6/2004 | Russell et al. |
| 2006/0005200 A1 | 1/2006 | Vega et al. |

FOREIGN PATENT DOCUMENTS

| | | |
|---|---|---|
| EP | 0272198 | 6/1988 |
| EP | 2320318 A1 | 5/2011 |
| JP | 06-202903-D2 | 7/1994 |

* cited by examiner

RISC PROCESSOR APPARATUS AND METHOD FOR SUPPORTING X86 VIRTUAL MACHINE

CROSS-REFERENCE TO RELATED APPLICATIONS

This application is the National Stage of International Application No. PCT/CN2008/002023, filed on Dec. 17, 2008, which claims the priority date of Chinese Application No. 200810102086.3, filed on Mar. 17, 2008 the contents of both being hereby incorporated by reference in their entirety.

FIELD OF THE INVENTION

The present invention relates to the technical field of cross-platform compatibility of microprocessor system architectures, and more particularly, to a Reduced Instruction Set Computing (RISC) processor apparatus and a method for supporting an X86 virtual machine.

BACKGROUND OF THE INVENTION

Central Processing Unit (CPU), "microprocessor" for short, is a core unit of a computer. The instruction set and design code (system architecture) adopted by a microprocessor are the primary characteristics of a computer, and they determine the types of the peripheral equipment and application software that a computer needs to use.

At present, there are two popular processor system architectures in the world: one is the Reduced Instruction Set Computing (RISC) processor system architecture represented by the MIPS32/64 Instruction Set of MIPS Technologies, Inc., and the other is the Complex Instruction Set Computing (CISC) processor system architecture represented by X86 of Intel Corporation. The CISC processor involves a huge number of instructions, some of which can execute functions quite complicated and generally need many clock periods to execute them; however, the RISC processor uses a relatively small quantity of available instructions to execute a group of simpler functions at a higher speed. The program software running on a processor adopting a different system architecture needs to be written according to the system architecture of the processor, and the application software running on X86 usually can't be run on a computer having a MIPS Instruction Set-based RISC processor, i.e., they are incompatible as what's always said.

However, computer manufacturers expect to save on costs of software development by running more existing software on a microprocessor of a system architecture manufactured by themselves and, meanwhile, to attain the object of maximizing their market shares.

In order to solve this problem, virtual machines emerge as the times require. Generally, a CPU computer having a single type of system architecture is called a host; meanwhile, a CPU environment of an unrelated system architecture type, which needs to be emulated by the host, is called an object machine, and an application program, which enables the host to execute one or more host instructions to run the software written for the object machine in response to the given object machine instruction, is needed and is called a virtual machine.

Virtual machines existing currently include SimOS, QEMU, Transmeta and so on. But, the existing virtual machines cost too much overhead and have a too low execution efficiency when they are running because of the tremendous differences among various system architectures, so it's very difficult to apply them to practical operations.

The efficiency of a binary instruction translation from the X86 virtual machine to the RISC relies on the similarity between the RISC and the X86 in system architecture to a great extent. But, the X86 system architecture has many characteristics that the RISC architecture does not have. Those characteristics include: a fixed-point operation instruction in the X86 system architecture supports the operation of flag bits; the floating-point number operation and the floating-point stack operation of 80 bits in the X86 architecture; and the existence of segment base registers; and so on. In this way, when the X86 virtual machine in the RISC processor is operating, the binary instruction translation will have a low efficiency due to the problem of translation between instructions of different system architectures, whereby the operation speed can't be improved.

SUMMARY OF THE INVENTION

It is an object of the present invention to provide a RISC processor apparatus and a method for supporting an X86 virtual machine, thereby improving the performance of the RISC processor.

The RISC processor supporting an X86 virtual machine, which is provided to achieve the object of the present invention, comprises an instruction module, a decoder, a look-up table, a fixed-point operation component and a floating-point operation component, wherein:

the instruction module is adapted for storing a virtual machine instruction set that supports the X86 virtual machine;

the decoder is adapted for, during the decoding of an instruction of the virtual machine instruction set, distinguishing the virtual machine instruction set mode of the instruction, decoding the instruction according to the distinguished virtual machine instruction set mode, and outputting the decoded instruction to the fixed-point operation component or the floating-point operation component;

the look-up table is adapted for storing the jump addresses in an X86 program and the MIPS jump addresses, and quickly looking up the translations from the jump addresses in the X86 program to the MIPS jump addresses according to the output of the decoder, thereby improving the performance of the virtual machine;

the fixed-point operation component is adapted for making a corresponding processing on the fixed-point instruction of the virtual machine instruction set according to the output of the decoder and outputting the execution result; and the floating-point operation component is adapted for making a corresponding processing on the floating-point instruction of the virtual machine instruction set according to the output of the decoder and outputting the execution result.

The RISC processor supporting an X86 virtual machine further comprises a memory access execution unit, a memory and a data path. The memory access execution unit completes the data transmission between a register and the memory via the data path according to the output of the decoder.

The RISC processor supporting an X86 virtual machine further comprises a general physical register pile including an overflow check register, an upper/lower bound address register, an emulation flag register, and a virtual machine mode control register. The overflow check register is adapted for storing the result of a stack overflow exception check when a floating-point access is performed on a stack register emulated in the RISC processor; the upper/lower bound address register is adapted for storing the valid addresses of the upper and lower bounds when emulating the bounded memory access mechanism of the X86 processor; the emulation flag register is adapted for emulating the flag bits of a flag register for realizing the X86 processor; and the virtual machine mode control register includes a control bit flag, wherein the control bit flag being 1 denotes that the corresponding instruction is running in an X86 virtual machine instruction set mode, and the control bit flag being 0 denotes that the corresponding instruction is running in a non-X86 virtual machine instruction set mode.

The RISC processor supporting an X86 virtual machine further comprises a floating-point register pile including a floating-point control register, floating-point register stacks, and Nos. 1-3 floating-point registers.

The virtual machine instruction set comprises one or a combination of more than one of a memory access extension instruction, a prefix instruction, an instruction related to the flag bit EFLAG, an instruction related to the floating-point stack, and an instruction related to the look-up table.

The decoder comprises an instruction processing module and a mode identifying module, wherein the instruction processing module is adapted for decoding an instruction of the virtual machine instruction set and outputting the decoded instruction to the fixed-point operation component or the floating-point operation component, and the mode identifying module is adapted for distinguishing the virtual machine instruction set mode of the instruction and making a corresponding processing during the decoding of the instruction.

The mode identifying module comprises a multiple memory decoding module and/or a multiple read decoding module. The multiple memory decoding module is adapted for, when the input instruction is a storage operation instruction of the memory access extension instruction, extending a source register into a plurality of adjacent registers an then outputting them to a memory access execution unit to be executed. The multiple read decoding module is adapted for, when the input instruction is a read operation instruction of the memory access extension instruction, decoding the read operation instruction into a plurality of internal operation instructions, extending a destination register into a plurality of adjacent registers and then distributing them to the plurality of internal operation instructions and outputting them to a memory access execution unit to be executed.

The mode identifying module further comprises a prefix instruction decoding module and a flag bit instruction decoding module. The flag bit instruction decoding module is adapted for processing the instructions related to the flag bit EFLAG in a working mode of emulating EFLAGS, and decoding the emulation flag register into the source register and/or destination register for the instructions according to the different instructions related to the flag bit EFLAG; and the prefix instruction decoding module is adapted for indicating that a plurality of instructions following the prefix instruction are in an X86 virtual machine instruction set mode.

When the range parameter of the prefix instruction is n, the decoder further comprises a prefix instruction counter for recording the instruction number of an instruction sequence influenced by the prefix instruction and not having a transfer instruction. The number of instructions is equal to the range parameter.

The decoder further comprises a TOP pointer register and a look-up table module, wherein the TOP pointer register is adapted for maintaining a floating-point stack operation pointer and storing the value of the floating-point stack operation pointer, and the look-up table module is adapted for realizing the conversion from an X86 source instruction address to an MIPS target instruction address by using a look-up table according to an instruction related to the look-up table.

The fixed-point operation component comprises a flag read-write module, a flag operation module, an exception processing module, and a prefix exception control register. The flag read-write module is adapted for reading and writing the values of the flag bits of the emulation flag register. The flag operation module is adapted for obtaining a flag bit of the emulation flag register according to the operation result or executing a branch jump instruction according to one or more flag bits of the emulation flag register when the RISC processor is in the working mode of the X86 virtual machine during an operation process. The exception processing module is adapted for setting the bit bd of a register Cause to 1 while pointing an EPC to the prefix instruction and executing the prefix instruction again after an exception service program is completed, using a method the same as that for an exception in a delay slot, if an execution exception occurs when the prefix instruction only influences the instruction immediately following it. The prefix exception control register is adapted for recording whether an instruction where an exception occurs is influenced by said prefix instruction, and for storing the count of the current instruction when a process is interrupted because of the occurrence of an exception and recovering the interrupted process according to the count when the interrupted process is returned because the exception is ended.

The floating-point operation component comprises a pointer operation module, a stack overflow determination module, and a conversion module. The pointer operation module is adapted for operating the TOP pointer register, and when the floating-point register stack operation is emulated, for emulating the stack operation of the stack operation pointer, modifying and monitoring the status of the stack operation pointer. The stack overflow determination module is adapted for checking the specified stack register in the floating-point register stack and operating the overflow check register according to the value of the stack register so as to perform a stack overflow exception check during a floating-point access. The conversion module is adapted for performing the conversion between the extended double-precision floating-point data and the double-precision floating-point data.

As shown in FIG. 2, to achieve the object of the present invention, a method for processing data in a RISC processor apparatus supporting an X86 virtual machine is provided. The method comprises the following steps:

Step A: setting a working mode of a RISC processor-based X86 virtual machine in a RISC processor;

Step B: reading an instruction and distinguishing the virtual machine instruction set mode of the instruction; during the decoding of the instruction, decoding the instruction according to the distinguished virtual machine instruction set mode of the instruction, and outputting the decoded instruction; and Step C: executing a corresponding computing or accessing processing according to the output and outputting the execution result.

When the process of processing data in the RISC processor supporting the X86 virtual machine involves the supporting of the use of the EFLAG instruction:

The Step A specifically includes:

Step A1: setting a working mode of a RISC processor-based X86 virtual machine in a RISC processor, indicating that the emulation flag register is available.

The Step B specifically includes:

Step B1: using a decoder to identify that the operation is in the working mode of emulating EFLAGS, and then decode the emulation flag register into a source register and/or a destination register according to different instructions.

The Step C specifically includes:

Step C1: when the RISC processor is in the working mode of a RISC processor-based X86 virtual machine during an operation process, reading/writing the values of flag bits in the emulation flag register to get/save the operation status, and obtaining flag bits of the emulation flag register according to the operation result or executing a branch jump instruction according to one or more flag bits of the emulation flag register.

When the process of processing data in the RISC processor supporting the X86 virtual machine involves the supporting of the floating-point format and floating-point stacks of the X86:

The Step A specifically includes:

Step A2: determining if the floating-point registers are selected to emulate a floating-point register stack operation according to the stack enable bit; or setting a general register, of which the low 8 bits, from low to high, represent the statuses of stack registers Nos. 0-7 in the floating-point register stack; or selecting any 3 general registers as a first floating-point register, a second floating-point register and a third floating-point register to perform the format conversion of the 64-bit floating-point number and the 80-bit floating-point number.

The Step B specifically includes:

Step B2: storing the value of the stack operation pointer in at least 3 bits of the TOP pointer register in the decoder; or decoding the newly added stack overflow determination instruction; or decoding the instruction for the conversion between the extended double-precision floating-point data and the double-precision floating-point data.

The Step C specifically includes:

Step C2: when the floating-point register stack operation is emulated, operating the pointer register so as to emulate the stack operation of the stack operation pointer, and modify and monitor the status of the stack operation pointer; or checking the specified stack register in the floating-point register stack and operating the overflow check register according to the value of the stack register so as to perform a floating-point stack overflow check; or executing the conversion between the extended double-precision floating-point data and the double-precision floating-point data.

When the process of processing data in the RISC processor supporting the X86 virtual machine involves the supporting of the storage structure of the X86:

The Step A specifically includes:

Step A3: setting 2 general registers as an upper bound address register and a lower bound address register, respectively, in the RISC processor-based X86 virtual machine.

The Step B specifically includes:

Step B3: during the translation of the X86-virtual-machine instruction set into the MIPS instruction set, using the decoder to decode the instruction to get a binary code that can be processed by the RISC processor.

The Step C specifically includes:

Step C3: in the memory access instruction after decoding, using the fixed-point operation component to determine the validities of the instruction operand address and the instruction address according to the upper bound addresses stored in the upper bound address register and/or the lower bound addresses stored in the lower bound address register; when the instruction operand address and the instruction address are both valid, executing the memory access operation; otherwise, triggering an address error exception.

When the process of processing data in the RISC processor supporting the X86 virtual machine involves the supporting of the virtual mechanism:

The Step A specifically includes:

Step A4: reading a prefix instruction and distinguishing the virtual machine instruction set mode of the instruction; or using the processor to read a multiple data width instruction and input it to the decoder; or when the RISC processor-based X86 virtual machine starts up, initializing the look-up table and filling in the look-up table using the content of the obtained instruction address of the X86 virtual machine to the MIPS instruction address.

The Step B specifically includes:

Step B4: during the decoding of the instruction, decoding the instruction according to the distinguished virtual machine instruction set mode of the instruction, and outputting the decoded instruction; or using the decoder to determine the type of the instruction, and to identify and decode the multiple data width instruction; or using the decoder to identify and decode the instruction related to the look-up table.

The Step C specifically includes:

Step C4: using the fixed-point operation component to execute the instruction affected by the prefix instruction and calculate the corresponding flag bit EFLAG according to the operation result; or sending the decoded multiple data width instruction to the memory access execution unit to execute the operation; or executing the instruction related to the look-up table to get the value of the target instruction address or jump to the target address to continue the execution.

THE BEST WAY TO CARRY OUT THE PRESENT INVENTION

In order to make the object, technical solution and advantages of the present invention more clear, a RISC processor apparatus and a method for supporting an X86 virtual machine according to the present invention are further explained in detail with reference to the accompanying drawings and examples. It should be understood that the embodiments described here are used only to explain this invention, rather than limit it.

The embodiments describe the RISC processor and the method for supporting an X86 virtual machine according to the present invention by taking a MIPS64 instruction set-based RISC processor apparatus as an example. However, it should be noted that the present invention is not limited to the MIPS64 instruction set-based RISC processor apparatus, and the scope for which protection is sought by the present invention is governed by the claims.

To solve the semantic gap between the X86 processor system and the RISC processor system and to realize the support of compatibility with the X86 processor on the RISC processor, the RISC processor and the method for supporting an X86 virtual machine according to the present invention need handle the following problems on the RISC processor:

1. supporting the use of the EFLAG instruction;
2. supporting the floating-point format and floating-point stacks;

3. supporting the storage structure; and
4. supporting the virtual mechanism.

Figure 1:
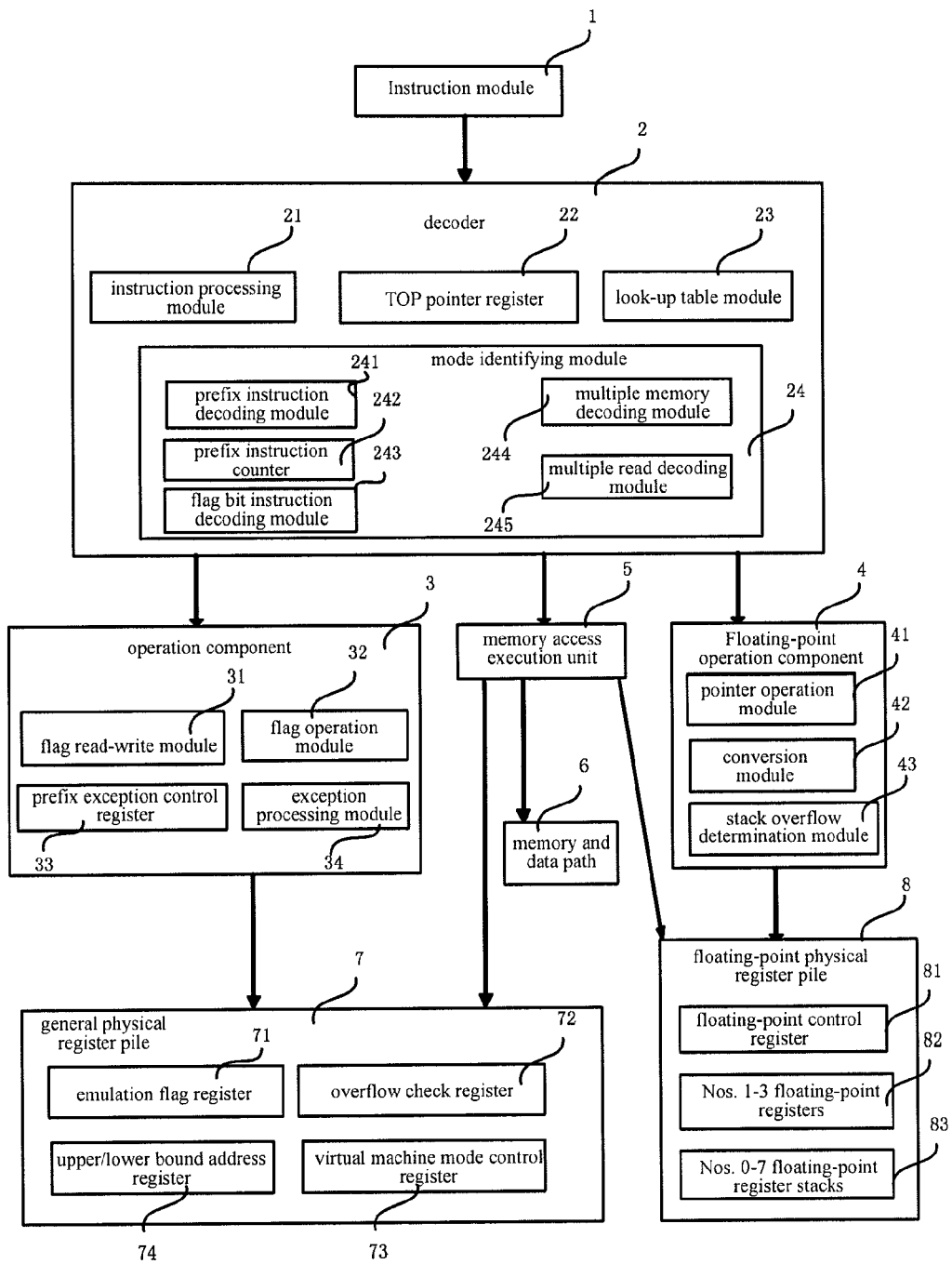
FIG. 1 is a schematic diagram illustrating the structure of a RISC processor apparatus supporting an X86 virtual machine according to the present invention.

As shown in FIG. 1, the RISC processor supporting an X86 virtual machine according to the present invention comprises an instruction module 1, a decoder 2, a look-up table (not shown), a fixed-point operation component 3, a general physical register pile 7, a floating-point operation component 4, a floating-point physical register pile 8, a memory access execution unit 5, and a memory and a data path 6, etc.

The instruction module 1 is adapted for storing a virtual machine instruction set that supports the X86 virtual machine, wherein the virtual machine instruction set may comprise one or a combination of more than one of a memory access extension instruction, a prefix instruction, an instruction related to the flag bit EFLAG, an instruction related to the floating-point stack, and an instruction related to the look-up table.

The decoder 2 is adapted for, during the decoding of an instruction of the virtual machine instruction set, distinguishing the virtual machine instruction set mode of the instruction, decoding the instruction according to the distinguished virtual machine instruction set mode, and outputting the decoded instruction to the fixed-point operation component 3 or the floating-point operation component 4.

The look-up table is adapted for storing the jump addresses in an X86 program and the MIPS jump addresses, and quickly looking up the translations from the jump addresses in the X86 program to the MIPS jump addresses according to the output of the decoder.

The fixed-point operation component 3 is adapted for making a corresponding processing on the fixed-point instruction of the virtual machine instruction set according to the output of the decoder 2 and outputting the execution result.

The floating-point operation component 4 is adapted for making a corresponding processing on the floating-point instruction of the virtual machine instruction set according to the output of the decoder 2 and outputting the execution result.

The memory access execution unit 5 is adapted for completing the data transmission between a register and the memory via the data path according to the output of the decoder.

Preferably, the decoder 2 comprises an instruction processing module 21, a mode identifying module 24, a TOP pointer register 22 and a look-up table module 23. The instruction processing module is adapted for decoding an instruction of the virtual machine instruction set and outputting the decoded instruction to the fixed-point operation component 3, the floating-point operation component 4 or the memory access execution unit 5. The mode identifying module 24 is adapted for distinguishing the virtual machine instruction set mode of the instruction and making a corresponding processing during the decoding of the instruction.

The mode identifying module 24 comprises a multiple memory decoding module 244 and/or a multiple read decoding module 245. The multiple memory decoding module 244 is adapted for, when the input instruction is a storage operation instruction of the memory access extension instruction, extending a source register into a plurality of adjacent registers and then outputting them to a memory access execution unit 5 to be executed. The multiple read decoding module 245 is adapted for, when the input instruction is a read operation instruction of the memory access extension instruction, decoding the read operation instruction into a plurality of internal operation instructions, extending a destination register into a plurality of adjacent registers and then distributing them to the plurality of internal operation instructions and outputting them to a memory access execution unit 5 to be executed.

The mode identifying module 24 further comprises a prefix instruction decoding module 241 and a flag bit instruction decoding module 243. The flag bit instruction decoding module 243 is adapted for processing the instructions related to the flag bit EFLAG in a working mode of emulating EFLAGS, and decoding the emulation flag register 71 into the source register and/or destination register for the instructions according to the different instructions related to the flag bit EFLAG. The prefix instruction decoding module 241 is adapted for indicating that a plurality of instructions following the prefix instruction are in an X86 virtual machine instruction set mode; further, when the range parameter of the prefix instruction is n, the decoder 2 further comprises a prefix instruction counter 242 for recording the instruction number of an instruction sequence influenced by the prefix instruction and not having a transfer instruction. The number of instructions is equal to the range parameter.

The TOP pointer register 22 is adapted for maintaining a floating-point stack operation pointer and storing the value of the floating-point stack operation pointer. The look-up table module 23 is adapted for realizing the conversion from an X86 source instruction address to an MIPS target instruction address by using a look-up table according to an instruction related to the look-up table.

The fixed-point operation component 3 comprises a flag read-write module 31, a flag operation module 32, an exception processing module 34, and a prefix exception control register 33. The flag read-write module 31 is adapted for reading and writing the values of the flag bits of the emulation flag register 71. The flag operation module 32 is adapted for obtaining a flag bit of the emulation flag register according to the operation result or executing a branch jump instruction according to one or more flag bits of the emulation flag register when the RISC processor is in the working mode of the X86 virtual machine during an operation process. The exception processing module 34 is adapted for setting the bit bd of a register Cause to 1 while pointing an EPC to the prefix instruction and executing the prefix instruction again after an exception service program is completed, using a method the same as that for an exception in a delay slot, if an execution exception occurs when the prefix instruction only influences the instruction immediately following it. The prefix exception control register 33 is adapted for recording whether an instruction where an exception occurs is influenced by said prefix instruction, and for storing the count of the current instruction when a process is interrupted because of the occurrence of an exception and recovering the interrupted process according to the count when the interrupted process is returned because the exception is ended.

The general physical register pile 7 includes an overflow check register 72, an upper/lower bound address register 74, an emulation flag register 71, and a virtual machine mode control register 73. The overflow check register 72 is adapted for storing the result of checking whether or not a stack overflow exception exists when a floating-point access is performed on a stack register emulated in the RISC processor; the upper/lower bound address register 74 is adapted for storing the valid addresses of the upper and lower bounds when emulating the bounded memory access mechanism of the X86 processor; the emulation flag register 71 is adapted for emulating to realize the flag bits of a flag register for the X86 processor; and the virtual machine mode control register 73 includes a control bit flag, wherein the control bit flag being 1 denotes that the corresponding instruction is running in an X86 virtual machine instruction set mode, and the control bit flag being 0 denotes that the corresponding instruction is running in a non-X86 virtual machine instruction set mode.

The floating-point operation component 4 comprises a pointer operation module 41, a stack overflow determination module 43, and a conversion module 42. The pointer operation module 41 is adapted for operating the TOP pointer register, and when the operation of the floating-point register stack 83 is emulated, for emulating the stack operation of the stack operation pointer, modifying and monitoring the status of the stack operation pointer. The stack overflow determination module 43 is adapted for checking the specified stack register in the floating-point register stack 83 and operating the overflow check register 72 according to the value of the stack register so as to perform a stack overflow exception check during a floating-point access. The conversion module 42 is adapted for performing the conversion between the extended double-precision floating-point data and the double-precision floating-point data.

The floating-point register pile 8 includes a floating-point control register 81, floating-point register stacks, Nos. 0-7 floating-point register stacks 83, and Nos. 1-3 floating-point registers 82. The Nos. 1-3 floating-point registers 82 and the Nos. 0-7 floating-point register stacks 83 may be applied alternately or together.

The memory access execution unit 5 includes a merging unit and an upper/lower bound determination module. The merging unit is adapted for, after the multiple memory decoding module 244 decodes the instruction of reading the memory, merging a plurality of internal operations prior to the execution of the execution unit. The upper/lower bound determination module is adapted for, when the bounded memory access instruction is supported, determining the validities of addresses contained in the memory access instruction with respect to the upper-bound and lower-bound addresses.

Figure 2:
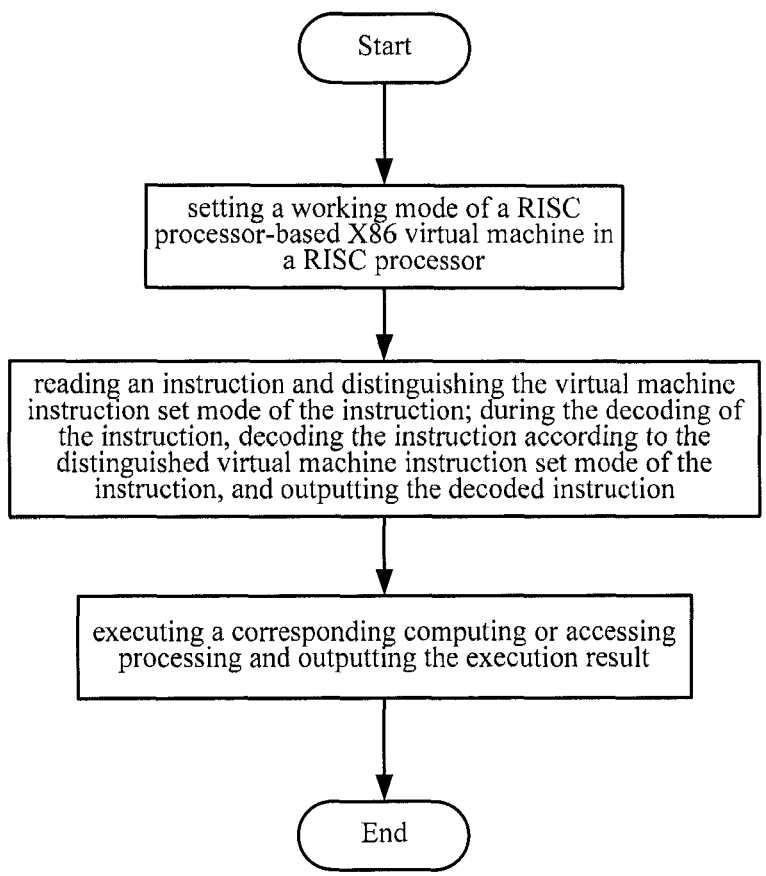
FIG. 2 is a flow chart illustrating a method for processing data in a RISC processor apparatus supporting an X86 virtual machine according to the present invention.

As shown in FIG. 2, to achieve the object of the present invention, a method for processing data in a RISC processor apparatus supporting an X86 virtual machine is provided. The method comprises the following steps:

Step A: setting a working mode of a RISC processor-based X86 virtual machine in a RISC processor;

Step B: reading an instruction and distinguishing the virtual machine instruction set mode of the instruction; during the decoding of the instruction, decoding the instruction according to the distinguished virtual machine instruction set mode of the instruction, and outputting the decoded instruction;

Step C: executing a corresponding computing or accessing processing according to the output and outputting the execution result.

When the process of processing data in the RISC processor supporting the X86 virtual machine involves the supporting of the use of the EFLAG instruction:

The Step A specifically includes:

Step A1: setting a working mode of a RISC processor-based X86 virtual machine in a RISC processor, indicating that an emulation flag register 71 is available.

The Step B specifically includes:

Step B1: using a decoder to identify that the operation is in the working mode of emulating EFLAGS, and then decode the emulation flag register 71 into a source register and/or a destination register according to different instructions.

The Step C specifically includes:

Step C1: when the RISC processor is in the working mode of a RISC processor-based X86 virtual machine during an operation process, reading/writing the values of flag bits in the emulation flag register 71 to get/save the operation status, and/or performing a control according to the values of flag bits in the emulation flag register 71.

When the process of processing data in the RISC processor supporting the X86 virtual machine involves the supporting of the floating-point format and floating-point stacks of the X86:

The Step A specifically includes:

Step A2: determining if the floating-point registers are selected to emulate the operation of a floating-point register stack 83 according to the stack enable bit; or setting a general register, of which the low 8 bits, from low to high, represent the statuses of stack registers Nos. 0-7 in the floating-point register stack 83; or selecting any 3 general registers as the $1^{st}$-$3^{rd}$ floating-point registers 82 to perform the format conversion of the 64-bit floating-point number and the 80-bit floating-point number.

The Step B specifically includes:

Step B2: storing the value of the stack operation pointer in at least 3 bits of the TOP pointer register in the decoder; or decoding the newly added stack overflow determination instruction; or decoding the instruction for the conversion between the extended double-precision floating-point data and the double-precision floating-point data.

The Step C specifically includes:

Step C2: when the operation of the floating-point register stack 83 is emulated, operating the pointer register so as to emulate the stack operation of the stack operation pointer, and modify and monitor the status of the stack operation pointer; or checking the specified stack register in the floating-point register stack 83 and operating the overflow check register 72 according to the value of the stack register so as to perform a floating-point stack overflow check; or executing the conversion between the extended double-precision floating-point data and the double-precision floating-point data.

When the process of processing data in the RISC processor supporting the X86 virtual machine involves the supporting of the storage structure of the X86:

The Step A specifically includes:

Step A3: setting 2 general registers as an upper bound address register and a lower bound address register 74, respectively, in the RISC processor-based X86 virtual machine.

The Step B specifically includes:

Step B3: during the translation of the X86-virtual-machine instruction set into the MIPS instruction set, using the decoder to decode the instruction to get a binary code that can be processed by the RISC processor.

The Step C specifically includes:

Step C3: in the memory access instruction after decoding, using the fixed-point operation component to determine the validities of the instruction operand address and the instruction address according to the upper bound addresses stored in the upper bound address register and/or the lower bound addresses stored in the lower bound address register; when the instruction operand address and the instruction address are both valid, executing the memory access operation; otherwise, triggering an address error exception.

When the process of processing data in the RISC processor supporting the X86 virtual machine involves the supporting of the virtual mechanism:

The Step A specifically includes:

Step A4: reading a prefix instruction and distinguishing the virtual machine instruction set mode of the instruction; or using the processor to read a multiple data width instruction and input it to the decoder; or when the RISC processor-based X86 virtual machine starts up, initializing the look-up table and filling in the look-up table using the content of the obtained instruction address of the X86 virtual machine to the MIPS instruction address.

The Step B specifically includes:

Step B4: during the decoding of the instruction, decoding the instruction according to the distinguished virtual machine instruction set mode of the instruction, and outputting the decoded instruction; or using the decoder to determine the type of the instruction, and to identify and decode the multiple data width instruction; or using the decoder to identify and decode the instruction related to the look-up table.

The Step C specifically includes:

Step C4: using the fixed-point operation component to execute the instruction affected by the prefix instruction and calculate the corresponding flag bit EFLAG according to the operation result; or sending the decoded multiple data width instruction to the memory access execution unit to execute the operation; or executing the instruction related to the look-up table to get the value of the target instruction address or jump to the target address to continue the execution.

The method for processing data in a RISC processor apparatus supporting an X86 virtual machine when the process of processing data in the RISC processor supporting the X86 virtual machine involves the supporting of the use of the EFLAG instruction is described in detail hereinafter.

Two manners are provided to support the use of the EFLAG instruction. One is to expand each physical register in the physical register pile to 72 bits, including 64 data bits and 8 flag bits. During operation, the data portion and the flag portion of the operation result are together written back into the destination register. Meanwhile, a latest flag bit pointer Reflag is arranged in the decoder 2 to indicate the logic number of the general register combined with the latest flag bit. The other is to additionally arrange an internal logic register in the physical register pile to specially realize the EFLAG flag bit of the X86, and to add a new relevant instruction to every operation instruction of modifying EFLAG to specially modify EFLAG.

Among the above two manners, the first one is to add the EFLAG bit "transversely" to every register, while the second one is to add a register "in the longitudinal direction" of all the registers to specifically store the EFLAG bit.

As a practical way, in order to support the flag bit EFLAG of the X86, the RISC processor apparatus supporting an X86 virtual machine according to the present invention comprises the emulation flag register 71 (M-EFLAGS) for emulating to realize flag bits of a flag register (EFLAGS) in an X86 instruction set-based CISC processor, wherein the low 6 bits of said register represent CF bit, PF bit, AF bit, ZF bit, SF bit and OF bit, respectively, from low to high.

The process of processing flag bits of a register in the RISC processor apparatus supporting an X86 virtual machine according to the present invention is described in detail hereinafter. The process comprises the following steps.

Step 110: setting a working mode of a RISC processor-based X86 virtual machine in a RISC processor, namely, setting an emulation flag register 71 available; identifying by the decoder 2 that the operation is in the working mode of a RISC processor-based X86 virtual machine, namely, in the working mode of emulating EFLAGS; and then decoding the emulation flag register 71 into a source register and/or a destination register according to different instructions;

wherein the emulation flag register (M-EFLAGS) emulates to realize flag bits of an X86 instruction set based flag register (EFLAGS), the low 6 bits of said register representing CF bit, PF bit, AF bit, ZF bit, SF bit and OF bit, respectively, from low to high.

When the emulation flag register 71 is available, said operation is identified to be in a working mode of a RISC processor-based X86 virtual machine, namely, in the working mode of emulating EFALGS, the values of the corresponding emulation flag register 71 are modified according to the execution result, and then the emulation flag register is decoded into a source register and/or a destination register according to different instructions, but the result may not be stored in the original destination register.

As a practical way, when an instruction related to the emulation flag register is modifying the flag bits of the emulation flag register, before said instruction there is a prefix instruction SETFLAG which indicates that said instruction is in the working mode of a RISC processor-based X86 virtual machine, denoting that the sequent instruction is in the working mode of an X86 virtual machine.

The instruction format is: SETFLAG /a prefix instruction of the working mode of emulating EFALGS.

It denotes that an instruction subsequent to said instruction is in the working mode of emulating EFLAGS.

Then, when it is being executed, only the values of the flag bits of the corresponding emulation flag register 4 are modified according to the execution result, while the result is not stored in the destination register. The following is an example:

A normal MIPS instruction is

ADD $5,$1,$2, which indicates that the result of the value of No. 1 general register plus the value of No. 2 general register is stored in No. 5 general register;

While the instruction of modifying the flag bit of the emulation flag register 71 is

SETFLAG

ADD $5,$1,$2, which indicates that the operation result of the value of No. 1 general register plus the value of No. 2 general register is not stored, but the corresponding bit of the flag bits of the emulation flag register 4 is modified according to the result.

The input set of the decoder 2 is all the possible 32-bit codes, including all legal and illegal instructions. In view of this mode, the decoder 2 is newly added with a legal input, SETFLAG, indicating that an instruction subsequent to said instruction is in the working mode of a RISC processor-based X86 virtual machine, i.e., in the working mode of emulating EFLAGS.

Based on the prefix instruction, the decoder 2 adjusts the internal operation code and sends it to the fixed-point operation component 3 according to the working mode of emulating EFLAGS when an instruction after the prefix instruction is being decoded. Here, after being decoded, the destination register of this instruction is changed into the emulation flag register (M-EFLAGS), and one of the source registers is also the emulation flag register (M-EFLAGS). Since some operations merely modify part of the emulation flag register (M-EFLAGS), the original emulation flag register (M-EFLAGS) needs to be sent to the fixed-point operation component 3.

Wherein, the adjustment of the internal operation code, including the operational contents like renaming, i.e., mapping from a logical register to a physical register, and reading and writing a register port, etc., are familiar to those skilled in the art, so it is no longer described in detail in the present invention.

After decoding, the decoder 2 outputs the instruction to the fixed-point operation component 3, which determines the internal operation code. If it's a normal instruction, the operation is performed in normal steps; and if it's in the working mode of emulating EFLAGS, a computed result is obtained first, and then the flag bit of the emulation flag register (M-EFLAGS) is set according to the computed result and the intermediate result, wherein the computed result may not be stored in the destination register.

As another embodiment, instructions of modifying the flag bits of the emulation flag register (M-EFLAGS), which are frequently used in the present invention, will correspond one to one to X86 instructions so that such an instruction is equivalent to two original instructions (a SETFLAG and a normal MIPS instruction). The following is an example:

a frequently used ADD instruction of modifying the flag bits of the emulation flag register defines the instruction X86ADD, then

X86ADD $5,$1,$2 is equivalent to

SETFLAG

ADD $5,$1,$2, these frequently used instructions are allocated with individual instruction slots during decoding. After a functional component identifies these instructions, the generated result is not sent to the destination register, but a corresponding flag bits of the stimulating flag register (M-EFLAGS) are generated according to the result and the flag bits are sent to the stimulating flag register (M-EFLAGS).

Step 120: reading and writing values of flag bits of the emulation flag register and/or performing a control according to the values of the flag bits of the emulation flag register when the RISC processor is in the working mode of a RISC processor-based X86 virtual machine during an operation process.

In said step 120, reading and writing of values of flag bits of the emulation flag register comprises the following steps:

step 121: when the RISC processor is in the working mode of X86 virtual machine, extracting the values of one or more flag bits of the emulation flag register, controlling the extraction of one or more bits of the emulation flag register according to an 8-bit mask value therein, and storing the extracted values of the flag bits of the emulation flag register 71 in the destination register; and step 122: when the RISC processor is in the working mode of X86 virtual machine, modifying the values of one or more flag bits of the emulation flag register, controlling the modification of one or more bits of the emulation flag register according to an 8-bit mask value therein, and modifying the emulation flag register using the values in the source register.

As a practical way, the example of the present invention modifies or reads the values of the flag bits of the emulation flag register via two instructions, MTFLAG and MFFLAG. They modify or read the corresponding flag bits of the emulation flag register using an 8-bit mask. They respectively can write values of the flag bits of the emulation flag register and read out values of the flag bits of the emulation flag register to a specified general register.

The instruction MTFLAG realizes the extraction of the values of one or more flag bits of the emulation flag register (M-EFLAGS), controls the extraction of the one or more flag bits of the emulation flag register according to the 8-bit mask value (represented by an immediate) in the instruction, and stores the extracted values of the flag bits of the emulation flag register (M-EFLAGS) in the destination register GPR[rt].

The realization of extracting the flag bits of the emulation flag register using a mask is expressed by the following relation:

$$\text{GPR[rt]} \leftarrow \text{M-EFLAGS \& mask.}$$

For example, if the mask values are 0x00000100, the content of the second bit, i.e., AF bit, of the emulation flag register (M-EFLAGS) will be extracted and put into the destination register GPR[rt].

The instruction MTFLAG directly modifies the values of one or more flag bits of the emulation flag register (M-EFLAGS), controls the modification of one or more bits of the emulation flag register (M-EFLAGS) according to an 8-bit mask value (represented by an immediate) in the instruction, and modifies the emulation flag register (M-EFLAGS) using the values in the source register GPR[rs].

The realization of controlling and modifying the flag bits of the emulation flag register 4 (M-EFLAGS) using a mask is expressed by the following relation:

$$\text{M-EFLAGS \& mask} \leftarrow \text{GPR[rs]}$$

For example, if the content of a low 8 bit of GPR[rs] is 0x00010010 and the values of the mask field are 0x00110011, this instruction will modify the CF, PF, SF and OF bits of said emulation flag register (M-EFLAGS) and set the values of the four bits to 0, 1, 1 and 0, respectively.

In step 120, the control process comprises the following steps.

Step 121': obtaining flag bits of the emulation flag register (M-EFLAGS) according to the operation result.

For example, an instruction which operates directly according to the flag bits of the emulation flag register (M-EFLAGS), such as instruction X86ADD.

x86ADD /a 32-bit addition only affecting the bits of EFLAGS

Instruction format:

X86ADD rs, rt.

Instruction X86ADD realizes the addition of the 32-bit integer in register GPR [rs] and the 32-bit integer in register GPR [rt] to generate a 32-bit result. The result is not stored, but only the OF/SF/ZF/AF/PF bits of the emulation flag register (M-EFLAGS) are modified according to the result.

Step 122': executing a branch jump instruction according to one or more flag bits of the emulation flag register (M-EFLAGS).

For example, X86J M-EFLAGS condition transfer.

Instruction format is:

X86J.fmt offset.

Instruction X86J realizes the comparison of some bits of EFLAGS and performs a jump associated with the processor according to the corresponding condition.

Wherein, different instruction suffixes (fmt) represent different conditions, for example, X86J.a fmt=0 indicates that it jumps when CF=0 and ZF=0.

The high 6 bits (31 bit: 26 bit) of the 32-bit instruction code of the MIPS64 Instruction Set is an opcode domain, wherein the instruction slot of SPECIAL2 (of which the opcode is 011100) can be defined independently by the user according to the provisions of MIPS. All the newly added instructions in the example of the present invention are accomplished using the values of the empty slot of SPECIAL2 reserved in the existing MIPS64 Instruction Set.

The method for processing data in a RISC processor apparatus supporting an X86 virtual machine when the process of processing data in the RISC processor supporting the X86 virtual machine involves the supporting of the floating-point format and floating-point stacks of the X86 is described in detail hereinafter.

X86 provides a particular operation component, which supports an 80-bit floating-point precision in a stack operation mode and is greatly different from the RISC processor. In the present invention, in order to realize the support of the floating-point format and floating-point stacks, 3 instructions for the conversion between the 64-bit floating-point number and the 80-bit floating-point number are additionally arranged, wherein one instruction is arranged to convert the 80-bit floating-point number into the 64-bit floating-point number, and two are arranged to convert the 64-bit floating-point number into the 80-bit floating-point number.

As a practical way, from 32 general floating-point registers in a MIPS Instruction Set-based RISC physical register pile, any 3 general registers are dynamically selected as Nos. 1-3 floating-point registers 82 in charge of conversion. After the conversion finishes, said three general registers may also be used like other general registers.

Wherein:

the first floating-point register is adapted for storing the sign bits and exponents of the extended double-precision floating-point data, the sign bits and exponents taking up the low 16 bits of this register;

the second floating-point register is adapted for storing the mantissa portion of the extended double-precision floating-point data, the mantissa portion taking up 64 bits in all; and the third floating-point register is adapted for storing the double-precision floating-point data.

When the process of processing data in the RISC processor supporting the X86 virtual machine involves the supporting of the floating-point format and floating-point stacks of the X86, the method for processing data in a RISC processor apparatus supporting an X86 virtual machine comprises the following steps:

Step 210: dividing the 80-bit extended double-precision floating-point data in the memory into the sign bit & exponent portion and the mantissa portion, storing them in the different, first and second floating-point registers, respectively, converting them into the 64-bit double-precision floating-point data via the floating-point operation component 4, and storing said data in the third floating-point register.

Step 210 specifically includes the following steps.

Step 211: dividing the 80-bit extended double-precision floating-point data in the memory into the sign bit & exponent portion and the mantissa portion.

The 80-bit floating-point data is divided at the $64^{th}$ bit to form the first part including 16 bits in all from the $80^{th}$ bit to the $64^{th}$ bit and the second part including 64 bits in all from the $63^{rd}$ bit to the $0^{th}$ bit. After division, a user selects an existing read-in mode (MIPS provides a variety of read-in modes) and reads in the two parts into two floating-point registers $f(i) and $f(j), respectively.

Step 212: storing the sign bits and exponents of the 80-bit extended double-precision floating-point data in the floating-point register $f(i), the sign bits and exponents taking up the low 16 bits of this register.

Step 213: storing the mantissa portion of the 80-bit extended double-precision floating-point data in the floating-point register $f(j), the mantissa portion taking up 64 bits in all.

Step 214: taking the floating-point registers $f(i) and $f(j) as source registers, taking a floating-point register $f(t) as a destination register, and converting the 80-bit extended double-precision floating-point data stored in the floating-point registers $f(i) and $f(j) into the 64-bit double-precision floating-point data.

As a practical way, said conversion may be performed via an instruction (1):

CVT.D.LD $f(t),$f(i),$f(j)//*converting the extended double-precision into the double-precision    (1).

The high 6 bits (31 bit: 26 bit) of the 32-bit instruction code of the MIPS64 Instruction Set is an opcode domain, wherein the instruction slot of SPECIAL2 (of which the opcode is 011100) can be defined independently by the user according to the provisions of MIPS. The example of the present invention is defined by the values of the empty slot of SPECIAL2 reserved in the existing MIPS64 Instruction Set.

Formula (1) shows that the extended double-precision data represented by two stack registers $f(i) and $f(j) is converted into the double-precision data and stored in a stack register $f(t).

The outputted 64-bit data is stored in the floating-point register $f(t) to obtain the 64-bit double-precision floating-point data.

Step 220: extracting the sign bit & exponent portion and the mantissa portion of the 64-bit double-precision floating-point data in the third floating-point register, converting them into the sign bit & exponent portion and the mantissa portion of the 80-bit floating-point data via the floating-point operation component 4, storing them in the first and second floating-point registers, respectively, and using 2 registers to represent the 80-bit extended double-precision floating-point data so as to obtain the 80-bit floating-point data.

Step 220 specifically includes the following steps.

Step 221: storing 64-bit double-precision floating-point data in the floating-point register $f(t).

Step 222: extracting the sign bit & exponent portion (11 bits in all) of the double-precision floating-point data in the floating-point register $f(t), converting said portion into the sign bit & exponent portion (16 bits in all) of the 80-bit extended double-precision floating-point data, and storing said 16 bits in the floating-point register $f(i).

As a practical way, said conversion may be performed via an instruction (2):

CVT.UD.D $f(i),$f(t)//*converting the double-precision into the high bits of the extended double-precision    (2).

The double-precision data represented by the floating-point register $f(t) is converted into the high 16 bits of the extended double-precision data and stored in $f(i).

The converted exponents are subjected to a 0 extension to obtain the 64-bit floating-point data. Because the destination register is 64-bit, here only 16-bit data is enough. But, in order to be stored in a 64-bit destination register $f(i), 48 bits above the 16 bits must be subjected to the 0 extension before being stored in the floating-point register $f(i).

Step 223: extracting the mantissa portion (53 bits) in the floating-point register $f(t), converting said portion into the mantissa portion (64 bits) of the 80-bit floating-point data, and storing said 64 bits in the floating-point register $f(j).

The extraction is completed in the floating-point operation component 4, and the extracted 53-bit data is converted into the mantissa portion (64 bits) of the 80-bit floating-point data.

As a practical way, said conversion may be performed via an instruction (3):

CVT.LD.D $f(j),$f(t)//*converting the double-precision into the low bits of the extended double-precision    (3).

The double-precision data represented by the floating-point register $f(t) is converted into the low 64 bits of the extended double-precision data and stored in the floating-point register $f(j).

The extraction and conversion may be performed in accordance with the relevant provisions of the IEEE754 Standard, and those skilled in the art may carry out the conversion of the present invention according to the instruction (2), so they are no longer described in detail in the present invention.

The converted mantissa is stored in the floating-point register $f(j).

Step 224: taking the values of the floating-point register $f(i) as sign bits and exponents and taking the values of the floating-point register $f(j) as mantissa so as to obtain the 80-bit extended double-precision floating-point data.

Thanks to the floating-point conversion of the present invention, a processor not of an X86 system architecture can support the particular 80-bit floating-point data type in the X86 so as to facilitate virtual machines to perform binary translation, enhance the efficiency of virtual machines and improve the compatibility of the processor.

Furthermore, in the X86 architecture, the number of the floating-point register given by part of floating-point instructions is just a relative value, and it plus the value of the top-of-stack pointer TOP of the floating-point circular stack in the floating-point status word is the real number of the floating-point register. In order to solve this problem, in the present invention, a TOP pointer register 22 is disposed in the decoder 2, the floating-point control register 81 in the floating-point physical register pile is arranged to maintain a stack enable signal and determine if 8 floating-point registers are selected to emulate a floating-point stack. If the stack enable bit is set, the source of or the number of the destination logic register for any register with a register number smaller than 8 involved in the corresponding floating-point operation instruction will be modified according to the TOP value and the TOP value will be modified according to the content of the instruction during decoding; then, they are sent to the processor; if the stack enable bit is cleared, during the operation, it shall be deemed that the stack emulated by the registers don't exist, and the processor operates normally according to the existing working steps.

The floating-point control register 81 is adapted for controlling and using the floating-point register file 8 to enable or prohibit the emulation of a floating-point register stack 83.

The floating-point control register 81 maintains a stack enable bit. When the enable bit is set to 1, it denotes that the processor will emulate a floating-point register stack operation of the X86 processor; and when the enable bit is set to 0, it denotes that the processor will not emulate a floating-point register stack operation of the X86 processor, and the processor will perform an operation processing according to a normal process.

In the embodiments of the present invention, 32 floating-point registers numbered 0 to 31 in the RISC processor are used for emulating the floating-point register stack operation of the X86 processor.

The TOP pointer register 22 is adapted for maintaining a TOP pointer, namely, a stack operation pointer, and storing the value of the TOP pointer. The TOP pointer may be read, written, increased by 1 or decreased by 1, etc.

The pointer operation module 41 is adapted for operating the pointer register, emulating the stack operation of the stack operation pointer of the pointer register, modifying and monitoring the phase of the stack operation pointer during emulating the floating-point register stack operation.

As a practical way, if the stack enable bit in the floating-point control register 81 is set, 8 registers among the 32 floating-point registers are selected to emulate the stack registers numbered 0 to 7 in the floating-point register stack of the X86 processor.

If the stack enable bit in the floating-point control register 81 is set to 1, it will be used during the operation, denoting that the floating-point register stack emulated by the registers will exist, thus any register with a number smaller than 8 involved in the floating-point operation instruction will be used as a stack register of the floating-point register stack 83, so as to emulate the floating-point register stack of the X86 processor.

Thereafter, the pointer operation module uses the TOP pointer to convert the numbers of the stack registers, namely, the number of the floating-point register that a user sees is converted into the number of the floating-point register used by the program. For instance, the number of a register means the number of a register ST(i), which is the $i^{th}$ unit away from the top of the stack, plus the value of the TOP pointer. If the value of the TOP pointer is 2, ST(0) will be the $2^{nd}$ register and ST(1) will be the $3^{rd}$ register. If the number overflows, a corresponding processing will be conducted to make the group of registers form a circular stack and to complete the function to be realized by the present invention, i.e., the function of emulating the floating-point register stack of the X86 processor. Then, the follow-up work, which is the same as the stack enable bit that hasn't been set, is carried out.

If the stack enable bit in the floating-point control register 81 is set to 0, i.e., cleared, during the operation, it shall be deemed that the stack emulated by the registers don't exist, and the processor operates normally according to the existing working steps.

Next, a method of emulating a floating-point stack operation in a RISC processor supporting an X86 virtual machine according to the present invention is further described in detail. The method comprises forming a floating-point register stack 83 of the 8 floating-point registers in the RISC processor, and completing the emulation of a stack operation of the floating-point registers via the floating-point control register 81 and by emulating the TOP pointer function of X86, i.e., the stack pointer operation function.

The method of emulating a floating-point stack operation in a RISC processor supporting an X86 virtual machine according to the present invention comprises the following steps:

Step 2100: determining if 8 floating-point registers are selected to emulate the 8 stack registers in a floating-point register stack and emulate a floating-point register stack operation according to the stack enable bit, and setting the pointer register; and Step 2200: operating the pointer register so as to emulate the stack operation of a stack operation pointer, and modify and monitor the status of the stack operation pointer when the floating-point register stack operation is emulated.

The Step 2100 includes the following steps:

Step 2110: selecting a bit in the floating-point control register 81 as a floating-point stack enable bit, wherein it denotes that a floating-point stack of the X86 processor will be emulated to perform a floating-point stack operation when the enable bit is set to 1, and it denotes that a floating-point stack of the X86 processor will not be emulated, a floating-point stack operation can't be performed, and the processor operates according to a normal process when the enable bit is set to 0; and Step 2120: setting a pointer register of at least 3 bits to store the value of the TOP pointer.

The value of the TOP pointer may be read, written, increased by 1 or decreased by 1. And, the TOP pointer is in the range of 0-7.

During the stack push, the TOP pointer is pushed into No. 7 register and the value of the TOP pointer is set to 6; if the value of the TOP pointer is 7 during the stack pop, the value of the TOP pointer after the stack pop will be set to 0.

The TOP pointer always points at the top-of-stack register, and the stack grows downwards from the top, namely, the value of the TOP pointer is decreased by 1 during the stack push and increased by 1 during the stack pop, so, when data is stored in No. 7 register (i.e., pushed onto the stack of No. 7 register), the value of the TOP pointer should be decreased by 1 to become 6. When data pops up from No. 7 register, the value of the TOP pointer should be increased by 1 to become 8. But, there are merely 8 registers numbered 0 to 7 in all, so the maximum value of the TOP pointer is 7. When the value is increased by 1, the TOP pointer should point at the next register, namely, No. 0 register in the circular stack, and then the value of the TOP pointer should become 0.

For instance, if the value of the TOP pointer is 3, in the case of an enable bit of 1, if the floating-point register involving in the operation is $f(i): i<=7$, a floating-point register $f(j)$ will substitute for the floating-point register $f(i)$ to conduct the operation, wherein $j=(i+3) \mod 8$;

if the register is $f(i): i>7$, no alteration shall be made and the floating-point register $f(i)$ will be used directly.

The Step 2200 includes the following steps:

Step 2210: setting a stack operation mode by setting the floating-point stack enable bit to 1 to allow a user to emulate a floating-point register stack to perform a floating-point stack operation;

as a practical way, setting a mode of emulating a floating-point stack mode, i.e. setting the bit to 1 in order to set the X86 floating-point stack mode may be executed by the following instruction:

The instruction has a format: SETTM.

The memory access extension instruction provided in the present invention is defined by the retention value of the empty slot of SPECIAL2 in the MIPS64 Instruction Set.

The operation of setting the enable bit to 1 is completed via the instruction, so as to set the bit for the X86 floating-point stack mode and allow a user to use the X86 floating-point stack to perform a floating-point operation.

Step 2220: clearing a stack operation mode by setting the floating-point stack enable bit to 0 to forbid a user to perform a floating-point stack operation by emulating a floating-point register stack;

as a practical way, the instruction of clearing the emulated floating-point stack mode and setting the bit to 0 for the X86 floating-point stack mode in the embodiments of the present invention has the following format: CLRTM.

The bits are cleared for the X86 floating-point stack mode, and the user is not allowed to use the X86 floating-point stack but can only use the floating-point registers of a MIPS processor to perform the floating-point operation.

Said stack pointer operation instructions for bit setting and clearance can complete the activation and disabling of a floating-point register stack, respectively.

Step 2230: increasing the value of the stack operation pointer by 1, namely, increasing the value of the TOP pointer by 1;

as a practical way, the instruction of increasing the value of the stack pointer by 1, namely, increasing the value of the TOP pointer by 1, in the embodiments of the present invention has the following format: INCTOP.

Step 2240: decreasing the value of the stack operation pointer by 1, namely, decreasing the value of the TOP pointer by 1;

as a practical way, the instruction of decreasing the value of the stack pointer by 1, namely, decreasing the value of the TOP pointer by 1, in the embodiments of the present invention has the following format: DECTOP.

Said instructions of increasing and decreasing the value of the TOP pointer by 1 can emulate the stack-push and stack-pop operations in a floating-point stack of the X86 processor, respectively.

Step 2250: reading the value of the stack operation pointer, namely, reading out the value of the TOP pointer;

as a practical way, the instruction for the operation of reading out the value of the TOP pointer in the embodiments of the present invention has the following format: MFTOP rd.

The function of the instruction is to read the value of the X86 floating-point top-of-stack pointer into the register GPR [rd].

Step 2260: writing the value of the stack operation pointer, namely, writing the current value of the TOP pointer into the pointer register;

as a practical way, the instruction for the operation of writing the value of the TOP pointer in the embodiments of the present invention has the following format: MTTOP imm.

The function of the instruction is to write a 3-bit immediate value (imm) into the X86 floating-point top-of-stack pointer.

Said instructions of reading and writing the TOP pointer may control and operate the floating-point stack conveniently.

In order to better understand the process of emulating a floating-point stack operation in a RISC processor supporting an X86 virtual machine according to the present invention, hereinafter a stack pointer operation in an add operation is taken as an example to illustrate it.

When the enable bit is 1 and the value of the TOP pointer is 2, the operation, add.s $f(6), $f(1), $f(9), is subjected to the following conversions inside the RISC processor:

the operation of emulating an X86 floating-point stack is activated, i.e., the enable bit is set to 1;

$f(6)$ is replaced by $f(0)$; //6+2 mod 8=0
$f(1)$ is replaced by $f(3)$; //1+2 mod 8=3
$f(9)$ needs not be converted; //9>7 so no conversion is needed and the register $f(9)$ is used directly.

Eventually, the expression of the operation actually performed is add.s $f(0), $f(3), $f(9). There is no stack-push or stack-pop operation here, so the TOP value won't change.

Meanwhile, due to the existence of a floating-point stack, a floating-point overflow check mechanism needs to be maintained, thereby realizing a real-time monitoring of the status of the floating-point stack and preventing the spread of an overflow exception of the floating-point stack.

In the embodiments of the present invention, the floating-point register stack 83 of the RISC processor of the present invention consists of 8 stack registers, which may perform floating-point operations directly and which are numbered in sequence, i.e., numbered 0 to 7, respectively.

The overflow check register 72 of the RISC processor in the embodiments of the present invention is adapted for realizing a TAG function of a floating-point flag register of the X86 and detecting if a stack overflow exception will occur when a floating-point access is performed on a stack register in the floating-point register stack 83. The overflow check register 72 is a multi-bit register having at least 8 bits that represent the TAG bits, namely, the overflow check function bits, which respectively represent the statuses of stack registers Nos. 0-7 in the floating-point register stack 83.

In the embodiments of the present invention, a general register r(i), of which the low 8 bits, from low to high, respectively represent the statuses of stack registers Nos. 0-7 in the floating-point register stack 83, is selected.

Each of the low 8 bits in the general register r(i) corresponds to a stack register in the floating-point register stack 83, and the values of each bit represent different statuses, wherein 0 represents null, i.e. stack push may be performed while stack pop may not, or an overflow will occur, and 1 represents valid, i.e. stack push may not be performed again, or an overflow will occur.

As a practical way, the RISC processor of the present invention comprises a floating-point register stack 83 consisting of 32 multi-bit floating-point registers numbered 0 to 31, wherein Nos. 0-7, 8 stack registers in all, emulate 8 stack registers in the floating-point register stack 83 of the X86; the RISC processor further comprises a 32-bit general register (fixed-point) r(i), of which the low 8 bits, from low to high, respectively represent the statuses of stack registers Nos. 0-7 in the floating-point register stack 83 so as to complete the TAG function of the X86 floating-point stack mechanism.

The stack overflow determination module 43 is adapted for checking the specified stack register in the floating-point register stack 83 and operating the overflow check register 72 according to the value of the stack register so as to perform a floating-point stack overflow check.

Next, a method of performing a floating-point stack overflow check in a RISC processor supporting an X86 virtual machine according to the present invention is further described in detail. The method comprises forming a floating-point register stack 83 of the 8 floating-point registers in the RISC processor, and taking a general register as the overflow check register 72, of which the low 8 bits emulate the TAG function of the X86, each said bit corresponding to different statuses of a stack register.

The method of performing a floating-point stack overflow check in a RISC processor supporting an X86 virtual machine comprises the following step:

Step 21000: checking the specified stack register in the floating-point register stack 83 and operating the overflow check register 72 according to the value of the stack register so as to perform a floating-point stack overflow check.

The Step 21000 includes the following steps:

Step 21100: determining if the specified stack register in the floating-point register stack is null; if it is null, setting the bit corresponding to the TAG bit of the specified overflow check register 72 to 1 and continuing the execution; otherwise, triggering a floating-point stack overflow exception;

Step 21200: determining if the specified stack register in the floating-point register stack is valid; if it is valid, setting the bit corresponding to the TAG bit of the specified overflow check register 72 to 0 and continuing the execution; otherwise, triggering a floating-point stack overflow exception;

Step 21300: determining if the two specified stack registers in the floating-point register stack both are valid; if both are valid and data in said stack registers needs not be popped, maintaining the value of the TAG bit of the specified overflow check register 72 and continuing the execution; otherwise, triggering a floating-point stack overflow exception;

Step 21400: determining if the two specified stack registers in the floating-point register stack are valid; if both are valid and data in one of said stack registers needs be popped, setting the bit corresponding to the TAG bit of an overflow check register 72, to which the stack register in which data is popped corresponds, to 0, and continuing the execution; otherwise, triggering a floating-point stack overflow exception; and Step 21500: determining if the two specified stack registers in the floating-point register stack are valid; if both are valid and data in both of said stack registers needs be popped, setting the two bits corresponding to the TAG bit of the corresponding overflow check register 72 to 0, and continuing the execution; otherwise, triggering a floating-point stack overflow exception.

Hereinafter, take the stack-push operation on a floating-point register as an example to further describe the method of performing a floating-point stack overflow check in a RISC processor in detail.

First of all, a RISC processor determines a stack top of a floating-point register stack and reads the TAG bit of an overflow check register 72 to which a stack register of said stack top corresponds.

The use of a RISC processor for determining a stack top of a floating-point register stack and determining the TAG bit of an overflow check register 72 to which the corresponding stack register of said stack top of the present invention corresponds according to the floating-point register stack of the present invention is a prior art, instead of an invention-creation of the present invention, and those skilled in the art may carry out the above operation based on the description of the embodiments of the present invention, so it is no longer described in detail in the present invention.

Then, the RISC processor determines if the corresponding TAG bit of the overflow check register 72 to which the stack register of said stack top corresponds is 0.

If it is 0, the corresponding TAG bit of the overflow check register 72 to which the stack register of said stack top corresponds will be set to 1, and the data will be written into said stack register, followed by completion and return.

However, if not, a floating-point stack overflow exception will be triggered.

As a practical way, in the embodiments of the present invention, a general register r(3) is chosen as the low 8 bits in an overflow check register r(3), that is, bit r(3)_0 to bit r(3)_7 correspond to the statuses of stack registers f(0) to f(7) in the floating-point register stack, respectively.

1) In the case of a stack-push operation with the stack top located in the stack register f(5);

determining if the 5$^{th}$ bit, namely, bit r(3)_4, in the overflow check register r(3) is 0;

if it is 0, first setting bit r(3)_4 in the overflow check register to 1, then pushing the data and storing it in the stack register f(5); and if it is 1, triggering a floating-point stack overflow exception.

2) In the case of a stack-pop operation with the stack top located in the stack register f(5);

determining if the 5$^{th}$ bit, namely, bit r(3)_4, in the overflow check register r(3) is 1;

if it is 1, first clearing bit r(3)_4 in the overflow check register, then popping the data and storing it in a specified floating-point register; and if it is 0, triggering a floating-point stack overflow exception.

3) In the case of an operational operation with two source operands located in the stack registers f(4) and f(5), respectively;

determining if the 4$^{th}$ bit, namely, bit r(3)_3, in the overflow check register r(3) is 1;

if it is 0, triggering a floating-point stack overflow exception; and if it is 1, continuing to perform the following steps:

determining if the 5$^{th}$ bit, namely, bit r(3)_4, in the overflow check register r(3) is 1;

if it is 1, continuing the operational operation; and if it is 0, triggering a floating-point stack overflow exception.

4) In the case of an operational & stack-pop operation with two source operands located in the stack registers f(4) and f(5), respectively;

if the stack top is located in the stack register f(5), determining if the $5^{th}$ bit, namely, bit r(3)_4, in the overflow check register r(3) is 1;

if it is 0, triggering a floating-point stack overflow exception; and if it is 1, continuing to perform the following steps:

determining if the $4^{th}$ bit, namely, bit r(3)_3, in the overflow check register r(3) is 1;

if it is 0, triggering a floating-point stack overflow exception; and if it is 1, continuing to perform the following step:

first clearing the $5^{th}$ bit, namely, bit r(3)_4, in the overflow check register, then continuing the operational operation.

5) In the case of an operational & continuous stack-pop operation with two source operands located in the stack registers f(4) and f(5), respectively;

determining if the $4^{th}$ bit, namely, bit r(3)_3, in the overflow check register r(3) is 1;

if it is 0, triggering a floating-point stack overflow exception; and if it is 1, first clearing the $4^{th}$ bit, namely, bit r(3)_3, in the overflow check register, then continuing to perform the following steps:

determining if the $5^{th}$ bit, namely, bit r(3)_4, in the overflow check register r(3) is 1;

if it is 1, clearing the $5^{th}$ bit, namely, bit r(3)_4, in the overflow check register, then continuing the operational operation; and if it is 0, triggering a floating-point stack overflow exception.

Next, the process of processing data in a RISC processor of the present invention, when the process of processing data in the processor supporting an X86 virtual machine involves the supporting of the storage structure of the X86, is described in detail hereinafter.

Because of the segment registers in the X86 processor, the memory access addressing and protection of the X86 are in a comparatively particular manner even in the user mode. Thus, the present invention provides an access operation supporting and determining if a memory access address exceeds the bound. In other words, a source register for "load" and "store" operations has a bound register, which neither calculates an address nor stores data but compares the access address and reports an address bound-exceeding exception if it finds that the access address exceeds the bound stipulated by the bound register.

The address bounds include an upper bound and a lower bound, and it must be ensured that the valid address of a memory access is not larger than the upper bound or not smaller than the lower bound. If the memory access address meets the conditions, these instructions will be accessed normally; otherwise, an address error exception will be triggered.

In the case of supporting a virtual machine in a RISC processor, when a memory access operation occurs during the translation of an X86 Instruction Set to a MIPS Instruction Set in the RISC processor, the determination of a memory access address, i.e. determining if a memory access address exceeds the bound, is added, thereby accelerating the translation of the memory access operation on the X86.

As a practical way, in the physical register pile in the embodiments of the present invention, an upper bound address register is adapted for storing the valid addresses as the upper bound, and a lower bound address register is adapted for storing the valid addresses as the lower bound.

The upper and lower bound address registers may be any general registers among physical registers.

The upper/lower bound determination module is adapted for, with respect to a memory access instruction, determining the validity of an instruction operand address according to the upper bound addresses stored in the upper bound address register and/or the lower bound addresses stored in the lower bound address register.

The determination of bound is added to every memory access instruction, such as the "load" or "store" instructions, in the MIPS Instruction Set. If the memory access address meets the conditions, these instructions will be accessed normally; otherwise, an address error exception in the MIPS will be triggered.

After decoding of the instructions, the address bound in the register is a register operand of the instructions, and when a valid address is created by operating the content data in a "base" mode, the valid address is first compared with the address bound in the register. If the semantic conditions of the instructions are met (i.e. if the register is an upper bound address register, the valid address will be smaller than or equal to the address bound in the register, or if the register is a lower bound address register, the valid address will be larger than or equal to the address bound in the register), a normal memory access operation will be completed; otherwise, an address error exception will be triggered.

In the embodiments of the present invention, as a practical way, a bound determination is added to all the memory access instructions (24 in all) in the MIPS Instruction Set, including the "load" and "store" instructions.

Wherein, 12 "load" instructions include 8 fixed-point instructions and 4 floating-point instructions, of which the addressing modes all are the "base" mode.

These instructions respectively are one or a combination of the following instructions: a byte-reading instruction with upper boundary conditions, a byte-reading instruction with lower boundary conditions, a half-word-reading instruction with upper boundary conditions, a half-word-reading instruction with lower boundary conditions, a word-reading instruction with upper boundary conditions, a word-reading instruction with lower boundary conditions, a double-word-reading instruction with upper boundary conditions, a double-word-reading instruction with lower boundary conditions, a single-precision floating point number-reading instruction with upper boundary conditions, a single-precision floating point number-reading instruction with lower boundary conditions, a double-precision floating point number-reading instruction with upper boundary conditions, and a double-precision floating point number-reading instruction with lower boundary conditions.

The instructions are described in detail as follows:

gsLBLE rt, Base, Bound

First, a valid address is derived from the content of GPR [base]. If the valid address is not smaller than or equal to the content of GPR[bound], an address error exception will be triggered; otherwise, 8-bit byte data will be read from the memory according to this valid address, and the data will be written into GPR[rt] after sign extension.

gsLBGT rt, Base, Bound

First, a valid address is derived from the content of GPR [base]. If the valid address is not larger than the content of GPR[bound], an address error exception will be triggered;

otherwise, 8-bit byte data will be read from the memory according to this valid address, and the data will be written into GPR[rt] after sign extension.

gsLHLE rt, Base, Bound

First, a valid address is derived from the content of GPR[base]. If the valid address is not smaller than or equal to the content of GPR[bound], an address error exception will be triggered; otherwise, 16-bit half-word data will be read from the memory according to this aligned valid address, and the data will be written into GPR[rt] after sign extension. Preferably, the valid address is aligned, so, if any bit in the low 1-bit address is not 0, an address error exception will be triggered.

gsLHGT rt, Base, Bound

First, a valid address is derived from the content of GPR[base]. If the valid address is not larger than the content of GPR[bound], an address error exception will be triggered; otherwise, 16-bit half-word data will be read from the memory according to this valid address, and the data will be written into GPR[rt] after sign extension. Preferably, the valid address is aligned, so, if any bit in the low 1-bit address is not 0, an address error exception will be triggered.

gsLWLE rt, Base, Bound

First, a valid address is derived from the content of GPR[base]. If the valid address is not smaller than or equal to the content of GPR[bound], an address error exception will be triggered; otherwise, 32-bit word data will be read from the memory according to this aligned valid address, and the data will be written into GPR[rt] after sign extension. Preferably, the valid address is aligned, so, if any bit in the low 2-bit address is not 0, an address error exception will be triggered.

gsLWGT rt, Base, Bound

First, a valid address is derived from the content of GPR[base]. If the valid address is not larger than the content of GPR[bound], an address error exception will be triggered; otherwise, 32-bit word data will be read from the memory according to this aligned valid address, and the data will be written into GPR[rt] after sign extension. Preferably, the valid address is aligned, so, if any bit in the low 2-bit address is not 0, an address error exception will be triggered.

gsLDLE rt, Base, Bound

First, a valid address is derived from the content of GPR[base]. If the valid address is not smaller than or equal to the content of GPR[bound], an address error exception will be triggered; otherwise, a 64-bit double word will be read from the memory according to this aligned valid address and written into GPR[rt]. Preferably, the valid address is aligned, so, if any bit in the low 3-bit address is not 0, an address error exception will be triggered.

gsLDGT rt, Base, Bound

First, a valid address is derived from the content of GPR[base]. If the valid address is not larger than the content of GPR[bound], an address error exception will be triggered; otherwise, a 64-bit double word will be read from the memory according to this aligned valid address and written into GPR[rt]. Preferably, the valid address is aligned, so, if any bit in the low 3-bit address is not 0, an address error exception will be triggered.

gsLWLEC1 ft, Base, Bound

First, a valid address is derived from the content of GPR[base]. If the valid address is not smaller than or equal to the content of GPR[bound], an address error exception will be triggered; otherwise, 32-bit data will be read from the memory according to this aligned valid address and written into the low 32 bits of FPR[ft]. Preferably, the valid address is aligned, so, if any bit in the low 2-bit address is not 0, an address error exception will be triggered.

gsLWGTC1 ft, Base, Bound

First, a valid address is derived from the content of GPR[base]. If the valid address is not larger than the content of GPR[bound], an address error exception will be triggered; otherwise, 32-bit data will be read from the memory according to this aligned valid address and written into the low 32 bits of FPR[ft]. Preferably, the valid address is aligned, so, if any bit in the low 2-bit address is not 0, an address error exception will be triggered.

gsLDLEC1 ft, Base, Bound

First, a valid address is derived from the content of GPR[base]. If the valid address is not smaller than or equal to the content of GPR[bound], an address error exception will be triggered; otherwise, 64-bit data will be read from the memory according to this aligned valid address and written into FPR[ft]. Preferably, the valid address is aligned, so, if any bit in the low 3-bit address is not 0, an address error exception will be triggered.

gsLDGTC1 ft, Base, Bound

First, a valid address is derived from the content of GPR[base]. If the valid address is not larger than the content of GPR[bound], an address error exception will be triggered; otherwise, 64-bit data will be read from the memory according to this aligned valid address and written into FPR[ft]. Preferably, the valid address is aligned, so, if any bit in the low 3-bit address is not 0, an address error exception will be triggered.

The embodiments of the present invention are defined by the values of the empty slots of LWC2 and SWC2 reserved in the existing MIPS64 Instruction Set. Since the high 6 bits (31 bit: 26 bit) of the 32-bit instruction code of the MIPS64 Instruction Set is an opcode domain, the instruction slots of LWC2 (of which the opcode is 110010) and SWC2 (of which the opcode is 111010) can be defined independently by the user according to the provisions of MIPS.

12 "store" instructions include 8 fixed-point instructions and 4 floating-point instructions, of which the addressing modes all are the "base" mode.

These instructions respectively are one or a combination of the following instructions: a byte-storing instruction with upper boundary conditions, a byte-storing instruction with lower boundary conditions, a half-word-storing instruction with upper boundary conditions, a half-word-storing instruction with lower boundary conditions, a word-storing instruction with upper boundary conditions, a word-storing instruction with lower boundary conditions, a double-word-storing instruction with upper boundary conditions, a double-word-storing instruction with lower boundary conditions, a single-precision floating point number-storing instruction with upper boundary conditions, a single-precision floating point number-storing instruction with lower boundary conditions, a double-precision floating point number-storing instruction with upper boundary conditions, and a double-precision floating point number-storing instruction with lower boundary conditions.

The instructions are described in detail as follows:

gsSBLE rt, Base, Bound

First, a valid address is derived from the content of GPR[base]. If the valid address is not smaller than or equal to the content of GPR[bound], an address error exception will be triggered; otherwise, the content of 8-bit byte data in GPR[rt] will be stored in this valid address in the memory.

gsSBGT rt, Base, Bound

First, a valid address is derived from the content of GPR[base]. If the valid address is not larger than the content of GPR[bound], an address error exception will be triggered;

otherwise, the content of 8-bit byte data in GPR[rt] will be stored in this valid address in the memory.

gsSHLE rt, Base, Bound

First, a valid address is derived from the content of GPR [base]. If the valid address is not smaller than or equal to the content of GPR[bound], an address error exception will be triggered; otherwise, the content of 16-bit half-word data in GPR[rt] will be stored in this aligned valid address in the memory. Preferably, the valid address is aligned, so, if any bit in the low 1-bit address is not 0, an address error exception will be triggered.

gsSHGT rt, Base, Bound

First, a valid address is derived from the content of GPR [base]. If the valid address is not larger than the content of GPR[bound], an address error exception will be triggered; otherwise, the content of 16-bit half-word data in GPR[rt] will be stored in this aligned valid address in the memory. Preferably, the valid address is aligned, so, if any bit in the low 1-bit address is not 0, an address error exception will be triggered.

gsSWLE rt, Base, Bound

First, a valid address is derived from the content of GPR [base]. If the valid address is not smaller than or equal to the content of GPR[bound], an address error exception will be triggered; otherwise, the content of 32-bit word data in GPR [rt] will be stored in this aligned valid address in the memory. Preferably, the valid address is aligned, so, if any bit in the low 2-bit address is not 0, an address error exception will be triggered.

gsSWGT rt, Base, Bound

First, a valid address is derived from the content of GPR [base]. If the valid address is not larger than the content of GPR[bound], an address error exception will be triggered; otherwise, the content of 32-bit word data in GPR[rt] will be stored in this aligned valid address in the memory. Preferably, the valid address is aligned, so, if any bit in the low 2-bit address is not 0, an address error exception will be triggered.

gsSDLE rt, Base, Bound

First, a valid address is derived from the content of GPR [base]. If the valid address is not smaller than or equal to the content of GPR[bound], an address error exception will be triggered; otherwise, the content of a 64-bit double word in GPR[rt] will be stored in this aligned valid address in the memory. Preferably, the valid address is aligned, so, if any bit in the low 3-bit address is not 0, an address error exception will be triggered.

gsSDGT rt, Base, Bound

First, a valid address is derived from the content of GPR [base]. If the valid address is not larger than the content of GPR[bound], an address error exception will be triggered; otherwise, the content of a 64-bit double word in GPR[rt] will be stored in this aligned valid address in the memory. Preferably, the valid address is aligned, so, if any bit in the low 3-bit address is not 0, an address error exception will be triggered.

gsSWLEC1 ft, Base, Bound

First, a valid address is derived from the content of GPR [base]. If the valid address is not smaller than or equal to the content of GPR[bound], an address error exception will be triggered; otherwise, the content of low 32-bit word data in FPR[ft] will be stored in this aligned valid address in the memory. Preferably, the valid address is aligned, so, if any bit in the low 2-bit address is not 0, an address error exception will be triggered.

gsSWGTC1 ft, Base, Bound

First, a valid address is derived from the content of GPR [base]. If the valid address is not larger than the content of GPR[bound], an address error exception will be triggered; otherwise, the content of low 32-bit word data in FPR[ft] will be stored in this aligned valid address in the memory. Preferably, the valid address is aligned, so, if any bit in the low 2-bit address is not 0, an address error exception will be triggered.

gsSDLEC1 ft, Base, Bound

First, a valid address is derived from the content of GPR [base]. If the valid address is not smaller than or equal to the content of GPR[bound], an address error exception will be triggered; otherwise, the content of a 64-bit double word in FPR[ft] will be stored in this aligned valid address in the memory. Preferably, the valid address is aligned, so, if any bit in the low 3-bit address is not 0, an address error exception will be triggered.

gsSDGTC1 ft, Base, Bound

First, a valid address is derived from the content of GPR [base]. If the valid address is not larger than the content of GPR[bound], an address error exception will be triggered; otherwise, the content of a 64-bit double word in FPR[ft] will be stored in this aligned valid address in the memory. Preferably, the valid address is aligned, so, if any bit in the low 3-bit address is not 0, an address error exception will be triggered.

In an instruction of determining an upper bound and a lower bound simultaneously, an address must meet the upper and lower boundary conditions simultaneously. Once a boundary condition is not met, a bound-exceeding exception will be triggered.

The upper/lower bound determination module is adapted for, in a memory access instruction, determining the validity of an instruction operand address according to the upper bound addresses stored in the upper bound address register and/or the lower bound addresses stored in the lower bound address register.

As a practical way, two instructions are added to the MIPS Instruction Set in the RISC processor for comparing the values of registers. Said two instructions are adapted for determining if an address exceeds the bound. If the address meets the conditions, no operation will be performed; otherwise, an address error exception in the RISC processor will be triggered.

Moreover, two instructions, gsLE rs, rt and gsGT rs, rt, are realized.

The instructions are described in detail as follows:

gsLE rs, rt

The values of registers are compared, and a conditional address error exception is set.

The values of a general register GPR [rs] and a general register GPR [rt] are compared. If the value of GPR [rs] is smaller than or equal to that of GPR [rt], the next instruction will be executed sequentially; otherwise, an adel exception will be triggered.

gsGT rs, rt

The values of registers are compared, and a conditional address error exception is set.

The values of a general register GPR [rs] and a general register GPR [rt] are compared. If the value of GPR [rs] is larger than that of GPR [rt], the next instruction will be executed sequentially; otherwise, an adel exception will be triggered.

Said two instructions are used for comparing an address. The register rs stores address bound values, and the register rt stores valid addresses to be compared. If the conditions are met, the next instruction will be executed sequentially; otherwise, an address error exception will be triggered.

Said two instructions are used for comparing the values of the general register GPR [rs] and the general register GPR [rt], respectively. If the value of GPR [rs] is smaller than/equal to or larger than that of GPR [rt] (wherein, "smaller than/ equal to" is for gsLE rs, rt, and "larger than" is for gsGT rs, rt), the next instruction will be executed sequentially; otherwise, an address error exception will be triggered.

The process of a bounded memory access of a RISC processor supporting an X86 virtual machine of the present invention comprises the following steps:

Step 31: setting 2 general registers in the physical register pile as the upper and lower bound address registers 74, respectively, in the RISC processor-based X86 virtual machine, wherein the upper bound address register stores the valid addresses as the upper bound, and the lower bound address register stores the valid addresses as the lower bound;

Step 32: during the translation of the X86-virtual-machine instruction set into the MIPS instruction set, using the decoder to decode the instruction to get a binary code that can be processed by the RISC processor; and Step 33: in the memory access instruction after decoding, using the fixed-point operation component 3 to determine the validity of the instruction operand address according to the upper bound addresses stored in the upper bound address register and/or the lower bound addresses stored in the lower bound address register.

The determination of bound is added to every memory access instruction, such as the "load" or "store" instructions, in the MIPS Instruction Set. If the memory access address meets the conditions, these instructions will be accessed normally; otherwise, an address error exception in the MIPS will be triggered.

The Step 33 includes the following steps:

Step 331: after decoding of the instructions, creating a valid address by operating the content data in a "base" mode, with the address bound in the register being a register operand of the instructions;

Step 332: first comparing the valid address with the address bound in the register; and Step 333: if the semantic conditions of the instructions are met (i.e. if the register is an upper bound address register, the valid address will be smaller than or equal to the address bound in the register, or if the register is a lower bound address register, the valid address will be larger than or equal to the address bound in the register), completing a normal memory access operation; otherwise, triggering an address error exception.

Specifically, for a "load" instruction operation, the Step 333 comprises:

in the case of a byte-reading instruction with upper boundary conditions, namely, gsLBLE rt, base, bound: first deriving a valid address from the content of GPR[base]; if the valid address is not smaller than or equal to the content of GPR[bound], triggering an address error exception; otherwise, reading 8-bit byte data from the memory according to this valid address, and writing it into GPR[rt] after sign extension;

in the case of a byte-reading instruction with lower boundary conditions, namely, gsLBGT rt, base, bound: first deriving a valid address from the content of GPR[base]; if the valid address is not larger than the content of GPR[bound], triggering an address error exception; otherwise, reading 8-bit byte data from the memory according to this valid address, and writing it into GPR[rt] after sign extension;

in the case of a half-word-reading instruction with upper boundary conditions, namely, gsLHLE rt, base, bound: first deriving a valid address from the content of GPR[base]; if the valid address is not smaller than or equal to the content of GPR[bound], triggering an address error exception; otherwise, reading 16-bit half-word data from the memory according to this aligned valid address, and writing it into GPR[rt] after sign extension; wherein, preferably, the valid address is aligned, so, if any bit in the low 1-bit address is not 0, an address error exception will be triggered;

in the case of a half-word-reading instruction with lower boundary conditions, namely, gsLHGT rt, base, bound: first deriving a valid address from the content of GPR[base]; if the valid address is not larger than the content of GPR[bound], triggering an address error exception; otherwise, reading 16-bit half-word data from the memory according to this aligned valid address, and writing it into GPR[rt] after sign extension; wherein, preferably, the valid address is aligned, so, if any bit in the low 1-bit address is not 0, an address error exception will be triggered;

in the case of a word-reading instruction with upper boundary conditions, namely, gsLWLE rt, base, bound: first deriving a valid address from the content of GPR[base]; if the valid address is not smaller than or equal to the content of GPR[bound], triggering an address error exception; otherwise, reading 32-bit word data from the memory according to this aligned valid address, and writing it into GPR[rt] after sign extension; wherein, preferably, the valid address is aligned, so, if any bit in the low 2-bit address is not 0, an address error exception will be triggered;

in the case of a word-reading instruction with lower boundary conditions, namely, gsLWGT rt, base, bound: first deriving a valid address from the content of GPR[base]; if the valid address is not larger than the content of GPR[bound], triggering an address error exception; otherwise, reading 32-bit word data from the memory according to this aligned valid address, and writing it into GPR[rt] after sign extension; wherein, preferably, the valid address is aligned, so, if any bit in the low 2-bit address is not 0, an address error exception will be triggered;

in the case of a double-word-reading instruction with upper boundary conditions, namely, gsLDLE rt, base, bound: first deriving a valid address from the content of GPR[base]; if the valid address is not smaller than or equal to the content of GPR[bound], triggering an address error exception; otherwise, reading a 64-bit double word from the memory according to this aligned valid address, and writing it into GPR[rt]; wherein, preferably, the valid address is aligned, so, if any bit in the low 3-bit address is not 0, an address error exception will be triggered;

in the case of a double-word-reading instruction with lower boundary conditions, namely, gsLDGT rt, base, bound: first deriving a valid address from the content of GPR[base]; if the valid address is not larger than the content of GPR[bound], triggering an address error exception; otherwise, reading a 64-bit double word from the memory according to this aligned valid address, and writing it into GPR[rt]; wherein, preferably, the valid address is aligned, so, if any bit in the low 3-bit address is not 0, an address error exception will be triggered;

in the case of a single-precision floating point number-reading instruction with upper boundary conditions, namely, gsLWLEC1 ft, base, bound: first deriving a valid address from the content of GPR[base]; if the valid address is not smaller than or equal to the content of GPR[bound], triggering an address error exception; otherwise, reading 32-bit data from the memory according to this aligned valid address, and writing it into the low 32 bits of FPR[ft]; wherein, preferably, the valid address is aligned, so, if any bit in the low 2-bit address is not 0, an address error exception will be triggered;

in the case of a single-precision floating point number-reading instruction with lower boundary conditions, namely, gsLWGTC1 ft, base, bound: first deriving a valid address from the content of GPR[bound]; triggering an address error exception; otherwise, reading 32-bit data from the memory according to this aligned valid address, and writing it into the low 32 bits of FPR[ft]; wherein, preferably, the valid address is aligned, so, if any bit in the low 2-bit address is not 0, an address error exception will be triggered;

in the case of a double-precision floating point number-reading instruction with upper boundary conditions, namely, gsLDLEC1 ft, base, bound: first deriving a valid address from the content of GPR[base]; if the valid address is not smaller than or equal to the content of GPR[bound], triggering an address error exception; otherwise, reading 64-bit data from the memory according to this aligned valid address, and writing it into FPR[ft]; wherein, preferably, the valid address is aligned, so, if any bit in the low 3-bit address is not 0, an address error exception will be triggered; and in the case of a double-precision floating point number-reading instruction with lower boundary conditions, namely, gsLDGTC1 ft, base, bound: first deriving a valid address from the content of GPR[base]; if the valid address is not larger than the content of GPR[bound]; triggering an address error exception; otherwise, reading 64-bit data from the memory according to this aligned valid address, and writing it into FPR[ft]; wherein, preferably, the valid address is aligned, so, if any bit in the low 3-bit address is not 0, an address error exception will be triggered.

For a "store" instruction operation, the Step S330 comprises:

in the case of a byte-storing instruction with upper boundary conditions, namely, gsSBLE rt, base, bound: first deriving a valid address from the content of GPR[base]; if the valid address is not smaller than or equal to the content of GPR[bound], triggering an address error exception; otherwise, storing the content of 8-bit byte data of GPR[rt] in this valid address in the memory;

in the case of a byte-storing instruction with lower boundary conditions, namely, gsSBGT rt, base, bound: first deriving a valid address from the content of GPR[base]; if the valid address is not larger than the content of GPR[bound], triggering an address error exception; otherwise, storing the content of 8-bit byte data of GPR[rt] in this valid address in the memory;

in the case of a half-word-storing instruction with upper boundary conditions, namely, gsSHLE rt, base, bound: first deriving a valid address from the content of GPR[base]; if the valid address is not smaller than or equal to the content of GPR[bound], triggering an address error exception; otherwise, storing the content of 16-bit half-word data of GPR[rt] in this aligned valid address in the memory; wherein, preferably, the valid address is aligned, so, if any bit in the low 1-bit address is not 0, an address error exception will be triggered;

in the case of a half-word-storing instruction with lower boundary conditions, namely, gsSHGT rt, base, bound: first deriving a valid address from the content of GPR[base]; if the valid address is not larger than the content of GPR[bound], triggering an address error exception; otherwise, storing the content of 16-bit half-word data of GPR[rt] in this aligned valid address in the memory; wherein, preferably, the valid address is aligned, so, if any bit in the low 1-bit address is not 0, an address error exception will be triggered;

in the case of a word-storing instruction with upper boundary conditions, namely, gsSWLE rt, base, bound: first deriving a valid address from the content of GPR[base]; if the valid address is not smaller than or equal to the content of GPR[bound], triggering an address error exception; otherwise, storing the content of 32-bit word data of GPR[rt] in this aligned valid address in the memory; wherein, preferably, the valid address is aligned, so, if any bit in the low 2-bit address is not 0, an address error exception will be triggered;

in the case of a word-storing instruction with lower boundary conditions, namely, gsSWGT rt, base, bound: first deriving a valid address from the content of GPR[base]; if the valid address is not larger than the content of GPR[bound], triggering an address error exception; otherwise, storing the content of 32-bit word data of GPR[rt] in this aligned valid address in the memory; wherein, preferably, the valid address is aligned, so, if any bit in the low 2-bit address is not 0, an address error exception will be triggered;

in the case of a double-word-storing instruction with upper boundary conditions, namely, gsSDLE rt, base, bound: first deriving a valid address from the content of GPR[base]; if the valid address is not smaller than or equal to the content of GPR[bound], triggering an address error exception; otherwise, storing the content of a 64-bit double word of GPR[rt] in this aligned valid address in the memory; wherein, preferably, the valid address is aligned, so, if any bit in the low 3-bit address is not 0, an address error exception will be triggered;

in the case of a double-word-storing instruction with lower boundary conditions, namely, gsSDGT rt, base, bound: first deriving a valid address from the content of GPR[base]; if the valid address is not larger than the content of GPR[bound], triggering an address error exception; otherwise, storing the content of a 64-bit double word of GPR[rt] in this aligned valid address in the memory; wherein, preferably, the valid address is aligned, so, if any bit in the low 3-bit address is not 0, an address error exception will be triggered;

in the case of a single-precision floating point number-storing instruction with upper boundary conditions, namely, gsSWLEC1 ft, base, bound: first deriving a valid address from the content of GPR[base]; if the valid address is not smaller than or equal to the content of GPR[bound], triggering an address error exception; otherwise, storing the content of low 32-bit word data of FPR[ft] in this aligned valid address in the memory; wherein, preferably, the valid address is aligned, so, if any bit in the low 2-bit address is not 0, an address error exception will be triggered;

in the case of a single-precision floating point number-storing instruction with lower boundary conditions, namely, gsSWGTC1 ft, base, bound: first deriving a valid address from the content of GPR[base]; if the valid address is not larger than the content of GPR[bound]; triggering an address error exception; otherwise, storing the content of low 32-bit word data of FPR[ft] in this aligned valid address in the memory; wherein, preferably, the valid address is aligned, so, if any bit in the low 2-bit address is not 0, an address error exception will be triggered;

in the case of a double-precision floating point number-storing instruction with upper boundary conditions, namely, gsSDLEC1 ft, base, bound: first deriving a valid address from the content of GPR[base]; if the valid address is not smaller than or equal to the content of GPR[bound], triggering an address error exception; otherwise, storing the content of a 64-bit double word of FPR[ft] in this aligned valid address in the memory; wherein, preferably, the valid address is aligned, so, if any bit in the low 3-bit address is not 0, an address error exception will be triggered; and in the case of a double-precision floating point number-storing instruction with lower boundary conditions, namely, gsSDGTC1 ft, base, bound: first deriving a valid address from the content of GPR[base]; if the valid address is not larger than the content of GPR[bound]; triggering an address error exception; otherwise, storing the content of a 64-bit double word of FPR[ft] in this aligned valid address in the memory;

wherein, preferably, the valid address is aligned, so, if any bit in the low 3-bit address is not 0, an address error exception will be triggered.

The Step 33 further includes the following step:

Step 334: in an instruction of determining an upper bound and a lower bound simultaneously, an address meeting the upper and lower boundary conditions simultaneously; and once a boundary condition is not met, triggering a bound-exceeding exception.

Preferably, the Step S330 is followed by the following step:

Step 34: in a memory access instruction, determining the validity of an instruction address according to the upper bound addresses stored in the upper bound address register and/or the lower bound addresses stored in the lower bound address register.

The Step 34 further includes the following steps:

Step 341: in a "load" instruction operation, namely, gsLE rs, rt, comparing the values of a general register GPR [rs] (namely, an upper bound address register) and a general register GPR [rt] (namely, a lower bound address register); if the value of GPR [rs] is smaller than or equal to that of GPR [rt], executing the next instruction sequentially; otherwise, triggering an adel exception; and Step 342: in a "store" operand instruction, namely, gsGT rs, rt, comparing the values of a general register GPR [rs] (namely, an upper bound address register) and a general register GPR [rt] (namely, a lower bound address register); if the value of GPR [rs] is larger than that of GPR [rt], executing the next instruction sequentially; otherwise, triggering an adel exception.

Thanks to the method of a bounded memory access of a RISC processor of the present invention, in a virtual machine supported by the RISC processor, a binary code that translates the X86-virtual-machine instruction set into the MIPS instruction set, when running on the RISC processor, can increase the operating speed of the RISC processor, thereby reducing the effect on the operating speed of the virtual machine and improving the operating efficiency of the virtual machine.

The method for processing data in a RISC processor apparatus supporting an X86 virtual machine when the process of processing data in the processor supporting the X86 virtual machine involves the supporting of the virtual mechanism is described in detail hereinafter.

In addition to the functional differences between the X86 instructions and the instructions of the RISC processor, the overhead of the virtual machine system will also lead to a reduction in the performance of the virtual machine. Thus, necessary supports need be provided for the mechanism of realizing the virtual machine. There are mainly 3 kinds of supports as follows.

N1) Supporting the Switch between a Virtual Machine Code and a Translated MIPS Code In the design of the virtual machine, the X86 general registers have been mapped to the fixed MIPS registers. But, during a context switch between a virtual machine code and a translated MIPS code, the values of these fixed MIPS registers need be stored or recovered to ensure that all these registers can be freely used in the context and are not disturbed by one another.

A memory access extension instruction with a data width 2 times the original data width is provided in the present invention to accelerate the context switch in the virtual machine and to improve its performance.

The mode identifying module 24 in the RISC processor supporting the X86 virtual machine of the present invention executes a memory access instruction on a multiple data width. The multiple-data-width memory access instruction includes 4 types of multiple-data-width memory access extension instructions: reading the memory for a multiple data width, writing in the memory for a multiple data width, reading the memory for the multiple data width of a floating-point register, and writing in the memory for the multiple data width of a floating-point register.

As a practical way, the present invention provides 4 multiple-data-width memory access extension instructions in all, including an instruction of reading the memory for a double multiple data width, an instruction of writing in the memory for a double multiple data width, an instruction of reading the memory for the double multiple data width of a floating-point register, and an instruction of writing in the memory for the double multiple data width of a floating-point register.

As a practical way, the multiple-data-width extension instructions provided by the present invention make use of the values of the empty slots of LWC2 and SWC2 reserved in the existing MIPS64 Instruction Set, wherein the high 6 bits (31 bit: 26 bit) of the 32-bit instruction code of the MIPS64 Instruction Set is an opcode domain. The instruction slots of LWC2 (of which the opcode is 110010) and SWC2 (of which the opcode is 111010) can be defined independently by the user according to the provisions of MIPS. The addressing mode of the memory access thereof is "base+8 bits offset".

Wherein, the 5-bit base domain represents a base address, the 5-bit rt (Register Target(Source/Destination)) domain represents a source/destination register, offset represents an offset address, and finally the 6-bit func domain is used for differentiating various extension instructions.

The 4 extension instructions of the present invention are custom instructions in the MIPS64 Instruction Set to be extended by the user.

For a store queue (SQ) instruction, the decoder outputs 1 internal sq instruction; and for a load queue (LQ) instruction, the decoder outputs 2 adjacent internal instructions lq1 and lq2, wherein lq1 carries the low 64-bit logic register number of the LQ instruction, and lq2 carries the high 64-bit logic register number of the LQ instruction.

The decoder 2 decodes the instructions and then sends the decoded instructions to a ready queue (not shown) of the memory access execution unit 5. The ready queue selects an operation whose operand is ready therefrom and sends it to a memory access component (not shown) of the memory access execution unit 5.

For a 128-bit (in all) LQ instruction of 4 words to read the memory, a merging unit of the memory access execution unit 5 merges two internal operations when they enter the ready queue. The method of merging includes, if it's found that the two adjacent operations that are going to enter the queue are generated by the decoding of the 128-bit LQ instruction of 4 words, not letting the latter of the two operations enter the ready queue but storing the destination physical register number of the latter in the high 64-bit destination physical register number of the former.

The LQ instruction after merging has two destination physical register numbers, which, when an address is determined (i.e. a corresponding source physical register is ready), will be sent to the memory access component of the memory access execution unit 5 to be executed.

The memory access execution unit 5 is a component for accessing data, i.e. for reading data from a memory or storing data in a memory according to instructions. This process is an existing standard technology that is obvious to those skilled in the art, so it is no longer described in detail in the embodiments of the present invention.

These four instructions, namely, the instruction of reading the memory for a double multiple data width, the instruction of writing in the memory for a double multiple data width, the instruction of reading the memory for the double multiple data width of a floating-point register, and the instruction of writing in the memory for the double multiple data width of a floating-point register, will be described hereinbelow.

gsLQ rt, offset(base)/reading 4-word data into the memory

Four words are read from the memory and written into registers. First an 8-bit offset with a sign plus the content of GPR[base] to obtain a valid address, then 128 bits of four words are read from the memory according to this aligned valid address and written into 2 adjacent general registers.

If rt is even, they will be written into registers rt and rt+1; if rt is odd, they will be written into registers rt−1 and rt.

The valid address is aligned, so, if any bit in the low 4-bit address is not 0, an address error exception will be triggered.

gsLQC1 ft, offset(base)/writing 4-word data into the memory

First an 8-bit offset with a sign plus the content of GPR [base] to obtain a valid address, then 128 bits of four words are read from the memory according to this aligned valid address and written into 2 adjacent floating-point registers.

If ft is even, they will be written into registers ft and ft+1; if ft is odd, they will be written into registers ft−1 and ft.

The valid address is aligned, so, if any bit in the low 4-bit address is not 0, an address error exception will be triggered.

gsSQC1 ft, offset(base)/storing 4-word data in the memory

First an 8-bit offset with a sign plus the content of GPR [base] to obtain a valid address, then the four words in the 2 adjacent general registers are written into the valid address in the memory.

If rt is even, the values of registers rt and rt+1 will be read therefrom and written into the memory; if rt is odd, the values of registers rt−1 and rt will be read therefrom and written into the memory.

The valid address is aligned, so, if any bit in the low 4-bit address is not 0, an address error exception will be triggered.

gsSQC1 ft, offset(base)/reading four words from floating-point registers and writing them into the memory First an 8-bit offset with a sign plus the content of GPR [base] to obtain a valid address, then the four words in the 2 adjacent floating-point registers are written into the valid address in the memory. If ft is even, the values of registers ft and ft+1 will be read therefrom and written into the memory; if ft is odd, the values of registers ft−1 and ft will be read therefrom and written into the memory.

The valid address is aligned, so, if any bit in the low 4-bit address is not 0, an address error exception will be triggered.

The data memory access method in a RISC processor apparatus supporting an X86 virtual machine according to the present invention comprises the following steps:

Step N110: first using the processor to read an instruction and input it to the decoder;

Step N120: using the decoder to determine the type of the instruction and to identify and decode the multiple data width instruction; and Step N130: sending the decoded multiple data width instruction to the memory access execution unit 5 to execute the operation.

As to the Step N120, if it is an instruction in an existing MIPS instruction set, the decoder will translate it into internal operations, e.g. the decoder will provide corresponding OP, source register and destination register, etc.;

if the instruction input is a multiple memory access extension instruction operation stated in the present invention, the decoder will automatically extend a source/destination register into two registers in pairs;

if rt is even, it will be stored in registers rt and rt+1; if rt is odd, it will be stored in registers rt−1 and rt.

If the instruction input is a read instruction of a multiple data width, the decoder will automatically extend a destination register into a plurality of adjacent registers and distribute the read instruction to a plurality of internal operations, the plurality of registers in pairs being the destination registers of said plurality of internal operations, respectively.

If the instruction input is a storing instruction of a multiple data width, the decoder will automatically extend a source register into a plurality of adjacent registers.

First, the processor reads an instruction and inputs it to the decoder. The decoder determines the type of the instruction. If it is an instruction in the original MIPS instruction set, the decoder will translate it into internal operations, e.g. the decoder will provide corresponding operation (OP), source register and destination register, etc., and then output them to a storing operation component to be executed; if the instruction input is a storing operation in the memory access extension instruction stated in the present invention, the decoder will automatically extend a source/destination register into two registers in pairs, and then output them to the storing operation component to be executed.

First, the processor reads an instruction and inputs it to the decoder. The decoder determines the type of the instruction and translates it into internal operations. In respect of the functional components of the processor, the coding of internal operations is more ordered than that of instructions and thus facilitates the simplification of internal logic. In a RISC processor, external instructions are generally one-to-one mapped to internal operations. The internal operations outputted by the decoder are composed of several domains, such as operation code (op), extended operation code (fmt), source register number, destination register number, immediate value and so on.

As to the Step N130, after the decoder decodes the instruction input, the decoded instruction is sent to the memory access execution unit 5. In the memory access execution unit 5, if it is a read operation instruction, 2 internal operations 1q1 and 1q2 of the read operation instruction LQ will merge into one operation, which will be sent to the memory access execution unit 5 to be executed.

If the instruction input is a 128-bit (in all) store queue instruction SQ of 4 words in the memory access extension instruction stated in the present invention, a decoder 3 will extend a source register number into two register numbers in pairs. For instance, No. 4 register is extended into Nos. 4-5 registers, and No. 7 register is extended into Nos. 6-7 registers. Two source register numbers as internal operations are sent to the ready queue of the memory access execution unit 5.

If the instruction input is a read instruction in the memory access extension instruction stated in the present invention, the decoder will translate said read instruction into two internal operations, automatically extend a destination register into two registers in pairs likewise, then distribute the read instruction to said two internal operations, output them to the memory access execution unit 5 to be executed, then merge them into one operation and send it to the memory access component of the memory access execution unit 5 to be executed.

That is to say, if the instruction input is a 128-bit (in all) load queue instruction LQ of 4 words in the memory access extension instruction stated in the present invention, the decoder will extend a destination register number into two register numbers in pairs, and split it into 2 adjacent internal operations 1q1 and 1q2, which carry said two destination register numbers, respectively, and which are sent to the ready queue of the memory access execution unit 5. The memory access execution unit 5 receives internal operations from the decoder, selects therefrom those for which the source physical registers are ready and sends them to the memory access component of the memory access execution unit 5. The LQ instruction as a memory access operation is sent to the memory access component, so the merging of two internal operations is completed by the merging module of the memory access execution unit 5. The method is to store the destination physical register of the 1q2 in the high 64-bit destination physical register of the operation 1q1 while not letting the 1q2 enter the ready queue. The memory access component executes a memory access operation. There are two value domains in the result of the 1q1, and said value domains should be wrote into respective physical registers.

N2) Distinguishing if the Translated Code is in the Mode of X86

To support an X86 virtual machine in a RISC processor, it's necessary to distinguish if an instruction is in the mode of the original instruction set or in the mode of X86. Take the MIPS instruction set as an example. For an addition instruction, one number plus another in the MIPS instruction set, but in the X86 instruction set, the addition instruction not only computes the addition of two operands but also modifies the flag bits of the corresponding EFLAGS according to the result of addition.

With respect to the above-mentioned problem, a method of distinguishing if a RISC instruction is running in an X86 virtual machine mode is provided in the present invention.

In accordance with the usage frequencies of different instructions, 3 distinguishing methods are provided in the present invention:

(1) control-bit-flag execution method: setting a special control bit flag x86mode in the RISC instruction of the present invention, wherein the flag being 1 denotes that a corresponding instruction is running in an X86 mode at the moment, and the flag being 0 denotes that the instruction is running in a non-X86 mode;

(2) prefix-instruction execution method: additionally setting a prefix instruction SETFLAG denoting that the sequent instruction is in an X86 mode in the present invention, wherein the method can be divided into two according to different scopes influenced by the prefix instruction: one is that the prefix instruction only influences an instruction subsequent to it, and the other is that the prefix instruction influences several instructions following it; and (3) special instruction method: setting special instructions in the instruction set to one-to-one correspond to the X86 instructions used at particularly high frequencies so as to enhance the efficiency in the present invention, wherein the instructions to be set may be classified into two major groups: 1) instructions one-to-one corresponding to the instructions relevant to the flag EFLAG in the X86 instruction set; and 2) instructions to operate particular structures in the X86 instruction set, such as an instruction corresponding to the instruction of a floating-point stack operation; and wherein the newly added instructions provide special instructions to partially support the X86 instructions to thereby reduce the corresponding overhead.

The mode identifying module 24 in the RISC processor apparatus supporting the X86 virtual machine of the present invention is adapted for distinguishing the virtual machine instruction set mode of the instruction.

In the RISC processor apparatus of the present invention, the decoder not only comprises a data path which is a prior art and has the functions of inputting and outputting codes and decoding instructions, but also can distinguish the virtual machine instruction set mode of an instruction according to the mode identifying module 24, decode the instruction according to the distinguished virtual machine instruction set mode and output the decoded instruction to the fixed-point operation component 3, thereby strengthening the functions of the existing decoders and increasing the operation speed of the processor by direct decoding.

After receiving a decoding instruction, the fixed-point operation component 3 executes a processing and outputs the execution result.

The fixed-point operation component 3 not only comprises a data path which is a prior art and has the functions of inputting and outputting instructions and executing instructions, but also can, after the decoder 2 distinguishes the instruction set mode of an instruction, execute a corresponding computing according to the different instruction mode and output the execution result.

(I) As a practical way, the mode identifying module 24 in the RISC processor apparatus of the present invention is a virtual machine mode control register 73, which includes a control bit flag X86MODE1, wherein the flag being 1 denotes that a corresponding instruction is running in an X86 virtual machine instruction set mode at the moment, and the flag being 0 denotes that a corresponding instruction is running in a non-X86 virtual machine instruction set mode at the moment.

In the MIPS64 Instruction Set of the RISC processor, some control registers Coprocessor0 (CP0) are reserved to be defined by the user, e.g. in all situations of a Sel bit, No. 22 register is reserved to be defined by the user.

In the embodiments of the present invention, one of those control registers (CP0) is used as a control flag bit X86MODE1 of the X86 mode, and when the mode of an instruction needs to be distinguished, a determination may be made by reading a corresponding bit of said control register. When the flag bit is 1, it denotes that a corresponding instruction is running in an X86 virtual machine instruction set mode at the moment; when the flag bit is 0, it denotes that a corresponding instruction is running in a non-X86 virtual machine instruction set mode at the moment.

When the RISC processor reads an instruction and the decoder 2 decodes the instruction and performs an execution, the decoder 2 first reads the control bit to flag X86MODE1 of the virtual machine mode control register 73, distinguishes the virtual machine instruction set mode according to the value (0 or 1) of the flag bit, and decodes the instruction according to its virtual machine instruction set mode till the control bit flag X86MODE1 of the virtual machine mode control register 73 is rewritten.

For example, when an addition instruction enters into the decoder, the RISC processor makes a determination on a corresponding control register and distinguishes if the instruction is in an X86 virtual machine instruction set mode or in a non-X86 virtual machine instruction set mode.

The flag operation module 32 of the fixed-point operation component 3 is adapted for, in response to an instruction in a virtual machine instruction set mode, performing an operation according to the instruction inputted and then computing a corresponding flag bit EFLAG according to the operation result.

(II) As a practical way, the mode identifying module 24 in the RISC processor apparatus of the present invention is a prefix instruction decoding module 241 included in the decoder, wherein the prefix instruction decoding module 241 comprises a prefix instruction SETFLAG denoting that a plurality of instructions following the prefix instruction are in an X86 virtual machine instruction set mode.

The prefix instruction in the prefix instruction decoding module 241 of the present invention is accomplished using the values of the empty slot of SPECIAL2 reserved in the MIPS instruction set.

The prefix instruction decoding module 241 of the decoder 2 sets a flag when decoding the prefix instruction, the instruction subsequent to this instruction is translated into an X86 virtual machine instruction set mode, and then the prefix instruction is translated into No Operation (NOP).

Preferably, the prefix instruction SETFLAG includes a range parameter denoting the scope influenced by the prefix instruction SETFLAG. The range parameter may be 1, and then it denotes that the prefix instruction only influences the instruction subsequent to it; and, the range parameter may also be n, and then it denotes that the prefix instruction only influences n instructions following it.

Preferably, the prefix instruction counter 242 of the decoder 2 is adapted for recording the instruction number n of an instruction sequence influenced by the prefix instruction and not having a transfer instruction.

When a currently influenced instruction enters into the fixed-point operation component, namely, when the next instruction enters into the decoder 2, n minus 1. No transfer instruction is allowed to occur in the instruction sequence, i.e. once a transfer instruction occurs, the instruction sequence starting from the transfer instruction will not be influenced by the prefix instruction.

Preferably, as a practical way, the exception processing module 34 of the fixed-point operation component 3 is adapted for setting the bit bd of a register Cause to 1 while pointing an EPC to the prefix instruction and executing the prefix instruction again after an exception service program is completed, using a method the same as that for an exception in a delay slot, if an execution exception occurs when the prefix instruction only influences the instruction immediately following it.

Preferably, as another embodiment, the prefix exception control register 33 of the fixed-point operation component 3 is adapted for recording whether an instruction where an exception occurs is influenced by said prefix instruction. When a process is interrupted because of the occurrence of an exception, the count of the current instruction is stored in the prefix exception control register 33; when the interrupted process is returned because the exception is ended, the interrupted process is recovered according to the count, namely, according to the count previously stored in the prefix exception control register 33.

The flag operation module 32 of the fixed-point operation component 3 is adapted for, in response to an instruction in a virtual machine instruction set mode, performing an operation according to the instruction inputted and then computing a corresponding flag bit EFLAG according to the operation result.

(III) As another embodiment, the mode identifying module 24 is an instruction processing module 21 adapted for indicating the virtual machine instruction set mode of the instruction among the MIPS instructions in the RISC processor.

For an X86 virtual machine instruction used at a particularly high frequency, it is necessary to set a flag indicating that the MIPS instruction is executed in an X86 virtual machine instruction set mode in the MIPS instruction set of the RISC processor through the instruction processing module 21. In this way, it is indicated that an X86 virtual machine instruction used at a high frequency is in an X86 virtual machine instruction set mode and is directly executed by the MIPS instruction set of the RISC processor to thereby reduce the corresponding overhead.

The instruction processing module 21 can only influence the decoding of an instruction it influences but can't influence other instructions, and other instructions are executed in their original virtual machine instruction set modes.

Preferably, the MIPS instructions in the RISC processor include virtual machine instructions corresponding to the instructions relevant to the flag EFLAG in the X86 instruction set, and virtual machine instructions to operate particular structures, such as a floating-point stack, in the X86 instruction set.

For example, an addition instruction (Add) of the instruction processing module 21 to the RISC processor indicates that the virtual machine instruction set mode of said instruction is the X86 virtual machine instruction set mode X86Add, which may be accomplished using the values of the empty slot of SPECIAL2 reserved in the MIPS instruction set of the RISC processor. Not like the original addition instructions (Add), this instruction just partially supports the original instruction; to be specific, it performs an addition operation on the values of registers and modifies a corresponding flag bit EFLAGS according to the result, but the computed result is not stored in the registers, that is, the values of the registers won't change.

The method for processing data in a RISC processor apparatus supporting an X86 virtual machine in multiple modes according to the present invention comprises the following steps.

Step N210: when reading an instruction, distinguishing the virtual machine instruction set mode of the instruction.

As a practical way, the Step N210 comprises the following step:

Step N211: using the decoder to read a prefix instruction SETFLAG which denotes that a plurality of instructions following the instruction are in an X86 virtual machine instruction set mode, and distinguishing the virtual machine instruction set mode of the instruction;

wherein the prefix instruction SETFLAG further includes a range parameter denoting the scope influenced by the prefix instruction SETFLAG: the range parameter may be 1, and then it denotes that the prefix instruction only influences the instruction subsequent to it; and, the range parameter may also be n (n≠1), and then it denotes that the prefix instruction only influences n instructions following it.

A flag is set during the decoding of the prefix instruction, the instruction subsequent to this instruction is translated into an X86 virtual machine instruction set mode, and then the prefix instruction is translated into No Operation (NOP).

As another embodiment, the Step N210 comprises the following step:

Step N210': when an instruction entering into the decoder 2, using the control bit flag X86MODE1 of the virtual machine mode control register 73 to distinguish the virtual machine instruction set mode of the instruction.

The Step N210' comprises the following steps:

Step N211': determining the control bit flag X86MODE of the virtual machine mode control register 73;

Step N212': when the flag bit is 1, denoting that a corresponding instruction is running in an X86 virtual machine instruction set mode at the moment; and Step N213': when the flag bit is 0, denoting that a corresponding instruction is running in a non-X86 virtual machine instruction set mode at the moment.

As another embodiment, the Step N210 comprises the following step:

Step N211': using the decoder to read an instruction and distinguish the virtual machine instruction set mode of the instruction according to the indicated virtual machine instruction set mode of the instruction.

Step N220: using the decoder to decode the instruction according to the distinguished virtual machine instruction set mode of the instruction and output the decoded instruction to the fixed-point operation component 3 of the RISC processor, during the decoding of the instruction.

When a prefix instruction is used to distinguish the virtual machine instruction set mode of the instruction, the following step is included:

Step N221: using the decoder to identify the prefix instruction via decoding, and setting a flag bit X86mode2=1 in the decoder.

The Step N220 further comprises the following step:

Step N222: recording the instruction number n of an instruction sequence influenced by the prefix instruction and not having a transfer instruction using the prefix instruction counter 242 in the decoder;

wherein when a currently influenced instruction enters into the fixed-point operation component, namely, when the next instruction enters into the decoder 2, n minus 1.

No transfer instruction is allowed to occur in the instruction sequence, i.e. once a transfer instruction occurs, the instruction sequence starting from the transfer instruction will not be influenced by the prefix instruction.

When the control bit flag X86MODE1 of the virtual machine mode control register 73 is used to distinguish the virtual machine instruction set mode of the instruction, the decoder is used for decoding in the Step N220 and the following step is included:

Step N221': when the RISC processor reads an instruction and the decoder 2 decodes the instruction and performs an execution, first using the decoder to read the control bit flag X86MODE1 of the virtual machine mode control register 73, distinguish the virtual machine instruction set mode according to the value (0 or 1) of the flag bit, and decode the instruction according to its virtual machine instruction set mode till the control bit flag X86MODE1 of the virtual machine mode control register 73 is rewritten.

Step N230: using the fixed-point operation component of the RISC processor to make a processing according to the output of the decoder and output the execution result.

When a prefix instruction is used to distinguish the virtual machine instruction set mode of the instruction, the following step is included:

Step N231: using the fixed-point operation component to execute an NOP instruction since the decoder translates the prefix instruction into an internal No Operation NOP.

In order to prevent interruption exception in the course of executing instructions in multi-mode instruction sets, preferably, the Step N230 comprises the following step:

Step N232: using the fixed-point operation component to set the bit bd (Branch Delay) of a register Cause to 1 while pointing an EPC (The Exception Program Counter) to the prefix instruction and executing the prefix instruction again after an exception service program is completed, using a method the same as that for an exception in a delay slot, if an execution exception occurs when the prefix instruction only influences the instruction immediately following it.

Generally, what's stored in the register EPC is an entry address of the original operation continued by the processor after an exception service program is completed.

Step N233: when the prefix instruction influences n instructions, using the prefix exception control register 33 of the fixed-point operation component to record whether an instruction where an exception occurs is influenced by said prefix instruction. When a process is interrupted because of the occurrence of an exception, the count of the current instruction is stored in the prefix exception control register 33. When the interrupted process is returned because the exception is ended, the interrupted process is recovered according to the count, namely, according to the count previously stored in the prefix exception control register 33.

Step N234: using the fixed-point operation component to perform an operation according to the instruction inputted and then compute a corresponding flag bit EFLAG according to the operation result.

Next, the method for processing data in a RISC processor apparatus in multiple modes according to the present invention is illustrated in the manner of a prefix instruction by taking the addition instruction as an example:

first, a prefix instruction enters into the decoder;

next, the decoder 2 identifies the prefix instruction via decoding, a flag bit X86mode2=1 is set in the decoder, and then the prefix instruction is translated into an internal No Operation NOP to execute the sequent instruction;

then, the instruction subsequent to the prefix instruction, namely, an addition instruction, enters into the decoder, the decoder determines if a prefix flag bit exists, and if the addition instruction does not fall into the parameter range of the prefix instruction, the decoder will normally translate said instruction into the source and destination registers and the operation code (op) of the internal operation that said instruction carries; if the addition instruction falls into the parameter range of the prefix instruction, namely, is in an X86 mode, the flag bit EFLAGS will be modified based on the computed result according to the X86 virtual machine instruction set mode, so the decoder will translate the flag bit EFLAGS into one of the source registers and meanwhile translate the flag bit EFLAGS into destination registers, and then translate said addition instruction into the source and destination registers and the operation code (op) of the internal operation that said instruction carries; and finally, the fixed-point operation component takes the output of the decoder as an input, and if it is a normal instruction in the MIPS instruction set, an addition computation will be performed; if it is an addition instruction influenced by the prefix instruction, the fixed-point operation component will first perform an addition computation and then compute the value of a new flag bit EFLAGS according to the result of the addition computation.

Thanks to the RISC processor apparatus and the method for processing data in the same in multiple modes according to the present invention, during the translation of virtual machine instructions in different modes into instructions that may be executed by the RISC processor apparatus, instructions are directly decoded and executed in the RISC processor apparatus so as to save a great deal time spent on translation, exponentially increase the operation speed of the processor apparatus and improve the overall performance of the processor apparatus.

N3) Supporting the Looking-Up of a Conversion from a Source Instruction Address to a Target Instruction Address There are a variety of virtual machines, the key of which is a translating or interpreting process, namely, a process of translating or interpreting a target code into or as a local code that may be executed on a local machine. During the execution of a local code, in the case of executing a jump instruction, a virtual machine needs to convert an instruction address of an X86 source program into an instruction address of a corresponding MIPS target program, and then realize the jump according to the instruction address of the target program. A structure that can solve the mapping from a source instruction address (an X86 instruction address) to a target instruction address (an MIPS target instruction address) is added to the RISC processor of the present invention, thereby accelerating the conversion from a source instruction address to a target instruction address and improving the performance of the virtual machine.

The look-up table module 23 in the RISC processor supporting an X86 virtual machine in the embodiments of the present invention is adapted for realizing the conversion from an X86 source instruction address to an MIPS target instruction address by using a look-up table.

In the present invention, a look-up table is supported as hardware, which quickly looks up the translations from jump addresses in an X86 program to MIPS jump addresses, thereby improving the performance of the virtual machine.

As a practical way, the look-up table may be a content addressable look-up table and realized by using a content-addressable memory (CAM) or a random access memory (RAM). For an RAM, if an address is input, data corresponding to the address will be output; for a CAM, if some content is input, an index number of a unit storing said content or the content of another unit associated with said index number will be output.

The look-up table may be a content addressable look-up table for realizing the translation from an X86 jump address to an MIPS jump address, namely, realizing the convention from an X86 source instruction address to an MIPS target instruction address in an X86 virtual machine of a RISC processor. The table entries are shown in Table 1.

TABLE 1

| Table Entries in the Look-up Table | | |
|---|---|---|
| ASID | SPC | TPC |

As described in Table 1, three domains, namely, Domain ASID, Domain SPC and Domain TPC, are used in the convention from the X86 source instruction address (SPC) to the MIPS target instruction address (TPC).

Wherein, Domain ASID is adapted for storing the ID numbers for initiating a plurality of processes of an X86 virtual machine on an operating system. When all these processes of the X86 virtual machine need to use the look-up table 3, the ID numbers (ASIDs) assigned to them by the operating system are used to differentiate them from one another so as to prevent interference from others.

Domain SPC is adapted for storing X86 source instruction addresses.

Domain TPC is adapted for storing MIPS target instruction addresses.

When the look-up table module 23 is looking up, the current ASIDs of the processes of the X86 virtual machine together with the SPC provided by the look-up table form an "address" portion of the CAM, which portion is sent to all the table entries. Every table entry compares the ASIDs and SPCs stored therein with the input ones, and outputs the TPCs stored therein once they match. Thus, for a process in the X86 virtual machine of the RISC processor, as long as an X86 source instruction address it intends to look up is input, a corresponding MIPS target instruction address will be looked up from the look-up table 23.

Wherein, the values of the Domain SPC and the Domain TPC in the look-up table are initialized during the initialization of the virtual machine, while the value of the Domain ASID is provided by the local operating system.

As a practical way, the look-up table 23 is realized via four instructions that access or modify the structure of the look-up table in the embodiments of the present invention.

Instruction 1: CAMPV instruction. Said instruction is adapted for querying the value of the table entry of the look-up table RAM.

The format of said instruction is as follows:

CAMPV rd, rs

The look-up table is indexed based on the content of a general register GPR[rs] to get the content in the RAM. If a table entry is hit, the corresponding content in the RAM will be stored in a target register GPR[rd]; if not, an entry address of the not-hit service program will be stored in the target register GPR[rd].

The process of executing the instruction means the entire flow that the processor executes the instruction, including value fetching, decoding, execution and so on. The part accessed by the instruction is the above-mentioned CAM look-up table.

Instruction 2: CAMPI instruction. Said instruction is adapted for querying an index of the table entry of the look-up table RAM.

The format of said instruction is as follows:

CAMPI rd, rs

The look-up table is indexed based on the content of a general register GPR[rs] to get the index of the table entry in which the content resides. If a table entry is hit, the index of the corresponding table entry will be stored in a target register GPR[rd]; if not, the most significant bit in the target register GPR[rd] will be set to 1.

The process of executing the instruction means the entire flow that the processor executes the instruction, including fetching, decoding, execution and so on. The part accessed by the instruction is the above-mentioned CAM look-up table.

Instruction 3: CAMWI instruction. Said instruction is adapted for filling in the look-up table according to the index of the table entry of the look-up table RAM. The format of said instruction is as follows:

CAMWI rd, rs, rt

The look-up table is filled in based on the value of a GPR [rd]. The table entries of the look-up table (CAM and RAM) are filled in with the values of the registers GPR[rs] and GPR[rt], respectively, based on the index values in the general register GPR[rd].

If the index values go beyond the range of the table entries of the look-up table, an address error exception will be caused.

The process of executing the instruction means the entire flow that the processor executes the instruction, including fetching, decoding, execution and so on. The part accessed by the instruction is the above-mentioned look-up table CAM.

Instruction 4: RAMRI instruction. Said instruction is adapted for reading the content of the table entry of the look-up RAM table according to the index of the table entry of the look-up table RAM.

The format of said instruction is as follows:

RAMRI rd, rs

The content of the look-up table RAM is read based on the value of a GPR[rs]. The content of the look-up table RAM is read based on the index value in a general register GPR[rs], and is stored in a target register GPR[rd].

If the index values go beyond the range of the table entries of the look-up table, an address error exception will be caused.

Hereinafter, the corresponding processing in the case that looking-up is not successful, namely, the looking-up of the look-up table is not successful, in other words, there is no such pair of SPC-TPC expected by the corresponding process in the CAM, is described in detail.

When the looking-up is not successful, namely, a table entry is not hit, jumping to the entry address of the not-hit service program and being processed by the not-hit service program.

The not-hit service program is an existing routine, which is an existing standard technology of the MIPS instruction set-based RISC processor. So, it won't be described in details in the embodiments of the present invention.

As a practical way, the entry address of the not-hit service program is stored in CAM.default of a CP0 register. The virtual machine provides a default value which is stored in CAM.default of a CP0 register as an entry address of the not-hit service program.

This is a control register of the processor. The control register uses a reading & writing manner the same as those of other control registers (the only difference lies in address), i.e., the virtual machine provides a default value as an entry address of the not-hit service program. When CAM executes looking-up while a table entry is not hit, the default value stored in the CAM.default is sent to the target register. So, in the case that a table entry is hit, the look-up table program may jump to the MIPS instruction address to continue the execution; in the case that a table entry is not hit, the program may jump to the entry address of the not-hit service program and then the look-up table will be filled in with a corresponding address found out by the not-hit service program. In this way, the addition of a transfer instruction that determines if a table entry is hit after looking-up may be avoided.

Because then the target address has been stored in the target register, a direct jump instruction in the existing MIPS64 is utilized to realize the jump.

Wherein, rs is the register in which the target address is stored.

As another embodiment, the entry address of the not-hit service program may be stored in the Item No. 0 of the table entries of the look-up table, instead of one control register in the Example 1.

A new instruction, VJR, is set in this method. As for the default, the content in the No. 31 general register is used as SPC looking-up. The function of the VJR instruction is similar to the function of the two instructions, CAMPV+JR, in the first method.

The format of said instruction is as follows:
VJR rt

The content of the look-up table RAM is read based on the value of the No. 31 general register. The content (namely, the converted target address) of the look-up table RAM is read according to the value of the general register GPR[31]. If the looking-up is successful, the content will be stored in the target register GPR[rt]. Then, the instruction jumps to the target address according to the value of the register rt; otherwise, the content of Item No. 0 of the look-up table RAM is stored in the target register GPR[rt]. The instruction jumps to the not-hit service program according to the value of the register rt.

The process of executing the instruction means the entire flow that the processor executes the instruction, including fetching, decoding, execution and so on. The part accessed by it is the above-mentioned CAM look-up table.

When a jump instruction using the source instruction address appears, the value of the source instruction address is stored in a fixed register (for example, the No. 31 register) by one instruction, e.g., the JMP rax instruction in the X86, prior to the jump instruction.

This is realized by means of two MIPS instructions:
Addiu $31, r2, 0x0
VJR r4

After decoding of the jump instruction and after the VJR instruction performs looking-up according to the value in the fixed register, if a table entry is hit, the jump instruction will directly jump to the code segment pointed by the target instruction address to continue the execution; and if not, the jump instruction will directly jump to Item No. 0 of the look-up table and then to the not-hit service program.

Next, a method for converting and looking-up instruction address in a RISC processor supporting an X86 virtual machine according to the present invention is described in detail. The method comprises the following steps:

Step N310: when an X86 virtual machine of the RISC processor starts up, initializing the look-up table and filling in the look-up table using the content of the obtained instruction address of the X86 virtual machine to the MIPS instruction address;

during initialization of the X86 virtual machine in the RISC processor, the not-hit service program is utilized, and the look-up table obtaining the corresponding X86 instruction address to the MIPS instruction address is obtained through the initialization via the CAMPI instruction and the CAMWI instruction according to the content of the hash table maintained by the not-hit service program.

Step N320: accessing the look-up table to complete the conversion from the X86 source instruction address to the target instruction address while executing a jump instruction in the X86 virtual machine of the RISC processor;

the Step N320 includes the following steps:

Step N321: using a CAMPV instruction for querying a table entry value of the look-up table to search the look-up table according to the source instruction address in the register to thereby obtain the target instruction address;

Step N322: if the looking-up is hit, storing the value of the directly obtained target instruction address in a target register and jumping by using the jump instruction to the code segment pointed by the target address to continue the execution; and Step N323: if the looking-up is not hit, storing the obtained address of the not-hit service program, which address is provided by the virtual machine, in the target register and jumping to the not-hit service program to continue the execution.

Step N330: the not-hit service program refilling in the look-up table based on the content of a hash table maintained by the virtual machine;

the Step N330 includes the following steps:

Step N331: using a CAMPI instruction for querying an index of a table entry of the look-up table to obtain an index of the table entry in which a value of the source instruction address resides, and storing the index in the target register; and Step N332: using a CAMWI instruction for filling in a look-up table based on an index of a table entry of the look-up table to fill in the table with an ASID of a progress, a source instruction address and a corresponding target instruction address based on a value of the index in the target register.

Preferably, the instruction-address conversion looking-up method further includes the following step:

Step N340: invalidating one item of content in the look-up table, or reading the content of the look-up table RAM.

The CAMWI instruction for filling in the look-up table based on an index of the table entry of the look-up table RAM is used to fill in said entry having the pointed index with a fixed value, which can't match with the source instruction address of the program, that is, said entry is invalidated.

The RAMRI instruction for reading the content of the table entry of the look-up table RAM according to the index of the table entry of the look-up table RAM is used to read the value of the table entry having a pointed index of the look-up table RAM and store the value in a target register for convenience of debugging.

In the RISC processor apparatus and the method for converting and looking-up instruction address in the RISC processor according to the present invention, a structure of the look-up table that can solve the mapping from an X86 source instruction address to an MIPS target instruction address is added to the RISC processor, and the conversion from the X86 source instruction address to the MIPS target instruction address in an X86 virtual machine of the RISC processor is accelerated, thereby improving the performance of the virtual machine.

In light of the drawings illustrating the embodiments of the present invention, other aspects and features of the present invention are obvious to those skilled in the art.

The embodiments of the present invention have been described and illustrated hereinabove. These embodiments should be considered illustrative only, and cannot be used to limit the present invention. The present invention should be interpreted based on the appended claims.

INDUSTRIAL APPLICABILITY

The RISC processor and the data processing method thereof according to the present invention provide support for the use of the EFLAG instruction, the floating-point format and floating-point stacks, the storage structure and the virtual mechanism, so as to narrow the semantic gap between the X86 and RISC systems and realize the support of the X86 virtual machine in the RISC processor, thereby increasing the processing speed of the X86 virtual machine in the RISC processor and improving the performance of the RISC processor.

What is claimed is:

1. A Reduced Instruction Set Computing (RISC) processor having a MIPS instruction set and supporting an X86 virtual machine, comprising:
    an instruction module;
    a decoder that includes a top-of-stack (TOP) pointer register and a look-up table module;
    a look-up table;
    a fixed-point operation component;
    a floating-point operation component; and
    a floating-point register pile that includes a floating-point control register, floating point register stacks, and numbers 1-3 floating-point registers, wherein:
    the instruction module is adapted for storing a virtual machine instruction set that supports the X86 virtual machine;
    the decoder is adapted for, during the decoding of an instruction of the virtual machine instruction set, distinguishing a virtual machine instruction set mode of the instruction, decoding the instruction according to the distinguished virtual machine instruction set mode, and outputting the decoded instruction to the fixed point operation component or the floating-point operation component;
    the look-up table is adapted for storing jump addresses in an X86 program and MIPS jump addresses, and looking up translations from the jump addresses in the X86 program to the MIPS jump addresses according to the output of the decoder;
    the fixed-point operation component is adapted for, when the instruction is a fixed-point instruction of the virtual machine instruction set, processing the fixed-point instruction of the virtual machine instruction set according to the output of the decoder and outputting an execution result;
    the floating-point operation component is adapted for, when the instruction is a floating-point instruction of the virtual machine instruction set, processing the floating-point instruction of the virtual machine instruction set according to the output of the decoder and outputting the execution result;
    the TOP pointer register is adapted for maintaining a floating-point stack operation pointer and storing a value of the floating-point stack operation pointer; and
    the look-up table module is adapted for realizing a conversion from an X86 source instruction address to an MIPS target instruction address by using the lookup table according to an instruction related to the look-up table.

2. The RISC processor supporting an X86 virtual machine according to claim 1, further comprising:
    a memory access execution unit;
    a memory; and
    a data path, wherein:
    the memory access execution unit completes a data transmission between a register and the memory via the data path according to the output of the decoder.

3. The RISC processor supporting an X86 virtual machine according to claim 2, further comprising:
    a general physical register pile including an overflow check register;
    an upper/lower bound address register;
    an emulation flag register; and
    a virtual machine mode control register, wherein:
    the overflow check register is adapted for storing the result of a stack overflow exception check when a floating-point access is performed on a stack register emulated in the RISC processor;
    the upper/lower bound address register is adapted for storing valid addresses of upper and lower bounds when emulating a bounded memory access mechanism of a X86 processor;
    the emulation flag register is adapted for emulating flag bits of a flag register of the X86 processor; and
    the virtual machine mode control register includes a control bit flag, wherein the control bit flag being 1 denotes that a corresponding instruction is running in an X86 virtual machine instruction set mode, and the control bit flag being 0 denotes that the corresponding instruction is running in a non-X86 virtual machine instruction set mode.

4. The RISC processor supporting an X86 virtual machine according to claim 1, wherein the virtual machine instruction set comprises one or a combination of more than one of a memory access extension instruction, a prefix instruction, an instruction related to flag bits in an EFLAG register, an instruction related to a floating-point stack, and an instruction related to the look-up table.

5. The RISC processor supporting an X86 virtual machine according to claim 4, wherein the decoder comprises an instruction processing module and a mode identifying module, and wherein:
the instruction processing module is adapted for decoding an instruction of the virtual machine instruction set and outputting the decoded instruction to the fixed point operation component or the floating-point operation component; and
the mode identifying module is adapted for distinguishing the virtual machine instruction set mode of the instruction and making a corresponding processing during the decoding of the instruction.

6. The RISC processor supporting an X86 virtual machine according to claim 5, wherein:
the mode identifying module comprises a multiple memory decoding module and/or a multiple read decoding module;
the multiple memory decoding module is adapted for, when the instruction is a storage operation instruction of a memory access extension instruction, extending a source register into a plurality of adjacent registers and then outputting contents of the extended source register to a memory access execution unit to be executed; and
the multiple read decoding module is adapted for, when the instruction is a read operation instruction of a memory access extension instruction, decoding the read operation instruction into a plurality of internal operation instructions, extending a destination register into a plurality of adjacent registers, and then distributing contents of the extended destination register to the plurality of internal operation instructions and outputting the contents of the extended destination register to a memory access execution unit to be executed.

7. The RISC processor supporting an X86 virtual machine according to claim 6, wherein:
the mode identifying module further comprises a prefix instruction decoding module and a flag bit instruction decoding module; and
the flag bit instruction decoding module is adapted for processing instructions related to flag bits in an EFLAG register when an operation is in a working mode of emulating EFLAGS, and decoding an emulation flag register into a source register and/or destination register; and
the prefix instruction decoding module is adapted for indicating that a plurality of instructions following a prefix instruction are in an X86 virtual machine instruction set mode.

8. The RISC processor supporting an X86 virtual machine according to claim 7, wherein when a range parameter of the prefix instruction is n, the decoder utilizes a prefix instruction counter for recording an instruction number of an instruction sequence influenced by the prefix instruction and not having a transfer instruction, wherein the number of instructions is equal to the range parameter.

9. The RISC processor supporting an X86 virtual machine according to claim 4, wherein:
the fixed-point operation component comprises a flag read-write module, a flag operation module, an exception processing module, and a prefix exception control register;
the flag read-write module is adapted for reading and writing the values of flag bits of an emulation flag register;
the flag operation module is adapted for obtaining a flag bit of the emulation flag register according to an operation result or executing a branch jump instruction according to one or more flag bits of the emulation flag register when the RISC processor is in a working mode of the X86 virtual machine during an operation process.

10. The RISC processor supporting an X86 virtual machine according to claim 1, wherein:
the floating-point operation component comprises a pointer operation module, a stack overflow determination module, and a conversion module;
the pointer operation module is adapted for operating the top-of-stack (TOP) pointer register, and when a floating-point register stack operation is emulated, for emulating a stack operation of a stack operation pointer, modifying and monitoring the status of the stack operation pointer;
the stack overflow determination module is adapted for checking a specified stack register in the floating-point register stack and operating an overflow check register according to the value of the specified stack register so as to perform a stack overflow exception check during a floating-point access; and
the conversion module is adapted for performing a conversion between extended double-precision floating-point data and double-precision floating point data.

11. A method for processing data in a Reduced Instruction Set Computing (RISC) processor supporting an X86 virtual machine, comprising the following steps:
Step A: setting a working mode of the RISC processor-based X86 virtual machine in the RISC processor;
Step B: reading an instruction and distinguishing a virtual machine instruction set mode of the instruction, decoding the instruction according to the distinguished virtual machine instruction set mode of the instruction, and outputting the decoded instruction; and
Step C: executing a corresponding computing or accessing processing according to the output decoded instruction, and outputting an execution result,
wherein, when the X86 virtual machine supports a floating-point format and floating-point register stacks,
the Step A includes:
Step A1: setting a working mode of the RISC processor-based X86 virtual machine in the RISC processor, indicating that an emulation flag register is available; and
Step A2: determining if floating-point registers are selected to emulate a floating-point register stack operation according to a stack enable bit, or setting a general register, of which the low 8 bits, from low to high, represent statuses of stack registers numbers 0-7 in the floating-point register stack, or selecting 3 general registers as a first floating-point register, a second floating-point register and a third floating-point register to perform a format conversion of a 64-bit floating-point number and a 80-bit floating-point number;
the step B includes:
Step B1: using a decoder to identify that an operation is in a working mode of emulating EFLAGS, and then decode the emulation flag register into a source register and/or a destination register according to different instructions; and
Step B2: storing a value of the stack operation pointer in at least 3 bits of a top-of-stack (TOP) pointer register in the decoder, or decoding a newly added stack overflow determination instruction, or decoding an instruction for a conversion between an extended double-precision floating-point data and a double precision floating-point data; and the Step C includes:
Step C1: when the RISC processor is in the working mode of the RISC processor-based X86 virtual machine during an operation process, reading and writing the values of flag bits in the emulation flag register to get and save operation status, and obtaining flag bits of the emulation flag register according to an operation result or executing a branch jump instruction according to one or more flag bits of the emulation flag register; and
Step C2: when the floating-point register stack operation is emulated, operating a pointer register so as to emulate the stack operation of the stack operation pointer, and modify and monitor status of the stack operation pointer, or checking a specified stack register in the floating-point register stack and operating an overflow check register according to a value of the stack register so as to perform a floating-point stack overflow check, or executing a conversion between the extended double-precision floating-point data and the double-precision floating-point data.

12. The method for processing data in a RISC processor supporting an X86 virtual machine according to claim 11, wherein when the X86 virtual machine supports a storage structure,
the Step A includes:
Step A3: setting 2 general registers as an upper bound address register and a lower bound address register, respectively, in the RISC processor-based X86 virtual machine;
the Step B includes:
Step B3: during a translation of a X86-virtual-machine instruction set into a MIPS instruction set, using the decoder to decode the instruction to get a binary code that can be processed by the RISC processor; and
the Step C includes:
Step C3: in a memory access instruction after decoding, using a fixed point operation component to determine validities of an instruction operand address and an instruction address according to an upper bound addresses stored in an upper bound address register and/or a lower bound addresses stored in a lower bound address register, and when the instruction operand address and the instruction address are both valid, executing a memory access operation, and otherwise, triggering an address error exception.

13. The method for processing data in a RISC processor supporting an X86 virtual machine according to claim 11, wherein when the X86 virtual machine supports virtual mechanism,
the Step A includes:
Step A4: reading a prefix instruction and distinguishing the virtual machine instruction set mode of the prefix instruction, or using the processor to read a multiple data width instruction and input it to the decoder, or when the RISC processor-based X86 virtual machine starts up, initializing a look-up table and filling in the look-up table using a content of an obtained instruction address of the X86 virtual machine to a MIPS instruction address;
the Step B includes:
Step B4: during the decoding of the instruction, decoding the instruction according to a distinguished virtual machine instruction set mode of the instruction, and outputting the decoded instruction, or using the decoder to determine the type of the instruction, and to identify and decode a multiple data width instruction, or using the decoder to identify and decode the instruction related to the look-up table;
and the Step C includes:
Step C4: using a fixed-point operation component to execute an instruction affected by the prefix instruction and calculate a corresponding flag bit in an EFLAG register according to an operation result, or sending a decoded multiple data width instruction to a memory access execution unit to execute an operation, or executing an instruction related to the look-up table to get a value of a target instruction address or jump to a target address to continue execution.

14. The RISC processor supporting an X86 virtual machine according to claim 2, wherein the virtual machine instruction set comprises one or a combination of more than one of a memory access extension instruction, a prefix instruction, an instruction related to flag bits in an EFLAG register, an instruction related to a floating-point stack, and an instruction related to the look-up table.

15. The RISC processor supporting an X86 virtual machine according to claim 3, wherein the virtual machine instruction set comprises one or a combination of more than one of a memory access extension instruction, a prefix instruction, an instruction related to flag bits in an EFLAG register, an instruction related to a floating-point stack, and an instruction related to the look-up table.

\* \* \* \* \*